United States Patent [19]
Szeliski et al.

[11] Patent Number: 5,611,000
[45] Date of Patent: Mar. 11, 1997

[54] SPLINE-BASED IMAGE REGISTRATION

[75] Inventors: Richard S. Szeliski, Arlington; James M. Coughlan, Somerville, both of Mass.

[73] Assignee: Digital Equipment Corporation, Maynard, Mass.

[21] Appl. No.: 586,357

[22] Filed: Jan. 16, 1996

Related U.S. Application Data

[63] Continuation of Ser. No. 200,060, Feb. 22, 1994, abandoned.

[51] Int. Cl.$^6$ ........................................... G06K 9/32
[52] U.S. Cl. ............................... 382/294; 382/293
[58] Field of Search ........................... 382/294, 295, 382/151, 293; 348/263, 700

[56] References Cited

U.S. PATENT DOCUMENTS

| | | | |
|---|---|---|---|
| 4,644,582 | 2/1987 | Morishita et al. | 382/294 |
| 5,048,103 | 9/1991 | Leclerc et al. | 382/294 |
| 5,067,015 | 11/1991 | Combridge et al. | 358/133 |
| 5,251,271 | 10/1993 | Fling | 382/294 |

OTHER PUBLICATIONS

J. L. Barron, et al, "Performance of Optical Flow Techniques, Robotics and Perception Laboratory", Queen's University, Jul. 1992 (Revised Jul. 1993).

B. K. P. Horn, "Motion Field & Optical Flow", Robot Vision, The MIT Press, 1986, pp. 278–298.

R. Bajcsy, et al, "Matching of Deformed Images", IEEE Computer Society, Catalog No. 83CH1801–0, 1982, pp. 251–353.

J. R. Bergen, et al, "Hierarchical Model–Based Motion Estimation", Second European Conference on Computer Vision, May 1992, pp. 237–252.

R. Bajcsy, et al, "Multiresolution Elastic Matching", Computer Vision, Graphics, and Image Processing, 1989, vol. 46, pp. 1–21.

Goshtasby, Ardeshir, "Registration of Images with Geometric Distortions", IEEE, 1988, pp. 60–64.

Sinha, Sarvajit et al., "A Two–Stage Algorithm for Discontinuity Preserving Surface Reconstruction", IEEE, 1992, pp. 36–55.

*Primary Examiner*—Jose L. Couso
*Assistant Examiner*—Matthew C. Bella
*Attorney, Agent, or Firm*—Dirk Brinkman

[57] ABSTRACT

The light intensity values of a first and second image are stored in a memory as pixels. A transformation from the second image to a derived image is perforated by a spline function in cooperation with a spline control grid. The spline control grid has a plurality of control vertices at predetermined locations with respect to the pixels of the second image. The transformation adjusts the light intensity values proportional to the distance between the control vertices and the pixels of the second image. The first image is compared with the derived image. The difference between the first image and the derived image is determined. The control vertices of the control grid are iteratively displaced until the difference between the first and derived image is less than a desired amount. The final coordinates of the control vertices parametrize the motion field of the first and second image.

25 Claims, 17 Drawing Sheets

SPLINE-BASED IMAGE REGISTRATION

This application is a continuation of application Ser. No. 08/200,060, filed Feb. 22, 1994, now abandoned.

FIELD OF THE INVENTION

This invention relates generally to image analysis, and more particularly to image registration.

BACKGROUND OF THE INVENTION

Scenes and objects in the physical world may be perceived as patterns of light intensifies varying in time and space. In most instances, the apparent motion of the brightness patterns, "the optical flow," is well correlated with the movement or "motion field" of the illuminated scene and objects, and therefore an analysis of the optical flow can be used to deduce the motion field.

Instantaneous samples of light intensity distributions can be captured by a camera on a film as a sequence of two-dimensional images. The images can be digitized by an analog-to-digital converter. In digital form, the patterns of light intensities are represented by pixels. The data values of the pixels represent the relative intensity of the light at given points in space and time. The problem of extracting motion information from a sequence of images is exceedingly complex. In the prior art, the quality of the extracted motion information competes heavily with the costs incurred to attain it.

A fundamental problem in image analysis is to recover the motion field from sequences of two-dimensional images. This motion extraction problem is alternatively called motion estimation, multiple view analysis, or image registration. Simply stated, image registration determines, for a given sequence of images, a representation of motion that best aligns pixels in one image with those in a subsequent image. The extracted motion information can be valuable in a wide variety of applications, such as motion compensated image compression, image compositing, pattern recognition, multi-frame stereo correspondence determination, image rectification, robot navigation, structure from motion extraction, feature tracking, and computer vision. For example, in image compression, storage requirements are greatly reduced when motion information is applied to a base image to synthetically predict subsequent images.

Images do not yield motion information readily. Many techniques use numerous tedious, and often inefficient steps. Not surprisingly, low-cost, gross examination of the images tends to provide low quality motion information. Conversely, higher quality motion information can only be extracted by examining the myriads of pixels in minute detail, usually at a substantially higher cost.

Economical solutions may be suitable for those applications where the quality of the motion information is of secondary importance. However, for applications such as medical imaging where the quality of the image information can not be compromised, the costlier solutions are the inevitable choices.

At a low-end of the quality/cost spectrum are global image registration techniques. In global technique, successive images are simply superimposed. The superimposed images are then displaced from each other in various directions, by trial-and-error, until the average light intensity difference between the images is minimized. The relative displacement can be convened to motion information. The motion field can be expressed parametrically as, for example, affine flow fields, pointing in the general direction of the inferred motion. For example, the general formulation:

$$x' = m_0 x + m_1 y + m_2 \qquad = \begin{bmatrix} m_0 & m_1 & m_2 \\ m_3 & m_4 & m_5 \end{bmatrix} \cdot \begin{bmatrix} x \\ y \\ 1 \end{bmatrix} \qquad [1]$$
$$y' = m_3 x + m_4 y + m_5$$

where x' and y' are the displaced coordinates of the pixels at x and y, and $m_0$ to $m_5$ are the motion parameters, can be used for simple transformations such as rigid, rotational, and scaled transformations.

Global image registration may be adequate for planar motion over a small direction. However, for more complex motions, a single motion descriptor for the entire image would clearly be erroneous for all but a small portion of the image. In addition, it is difficult to extract motion information with global estimating techniques if the speed of the optical flow is high, that is, the relative displacement of the pixels in successive images is large.

In one variation of global image registration, the image is partitioned into a number of smaller blocks. Each block is then individually aligned with a corresponding block of the next image to produce a motion field for each of the blocks. This technique is used for compressing video signals according to the Motion Picture Experts Group (MPEG) standard. Block-based image registration can be done at a reasonable cost without substantially degrading the quality of the images. However, block-based image registration may exhibit annoying visual artifacts due to motion field differences at abutting block boundaries.

At the high-cost end there are local image registration techniques. High-cost, pixel-based image registration can operate on either the raw, or alternatively, interpolated values of the individual pixels. In the first alternative, the discrete integral pixel values of the first and second image are compared over some small correlation window. This technique, using interpolated real number values, can also measure the rate of change of intensity values to converge on a motion estimate more rapidly. Obviously, examining the intensity relationships of individual pixels is time-consuming.

Understandably, there is a need for an image registration system and method which permits the blending of quality and cost factors. The registration method and system should enable the extraction of motion information with a quality comparable to that of local registration techniques, but at costs which are not excessively greater than those of global image registration. Furthermore, the system and method should be adaptable to a wide range of imaging analysis applications. In addition, it is desirable that the image registration techniques can be practiced without having special knowledge of the represented scenes or camera equipment used to capture the scenes.

SUMMARY OF THE INVENTION

The image registration system of the present invention extracts quality motion information from a sequence of images. In the general method, a first and second image are represented as a first and second set of pixels. The pixels, at predetermined coordinates, represent light intensity values. The pixels are stored in the memory of a computer system.

A transformation of the second image produces a derived image. The transformation is represented by a spline function in cooperation with a spline control grid. The spline control grid has a plurality of control vertices at coordinates relative to the coordinates of the pixels of the second image. The transformation adjusts the pixel values of the second image proportional to the distance between the control vertices and the pixels.

The first image is compared to the derived image. The difference between the first image and the derived image is determined. The gradient in the light intensity values of the derived image is also determined. The gradient is applied to the difference between the first and derived image to determine displacement vectors for the control vertices. The control vertices are iteratively displaced to minimize the difference between the first image and the "derived" image. When the difference between the first image and the derived image is less than a desired amount, the coordinates of the control vertices substantially parametrize the motion field.

DETAILED DESCRIPTION OF PREFERRED EMBODIMENTS

Figure 1:
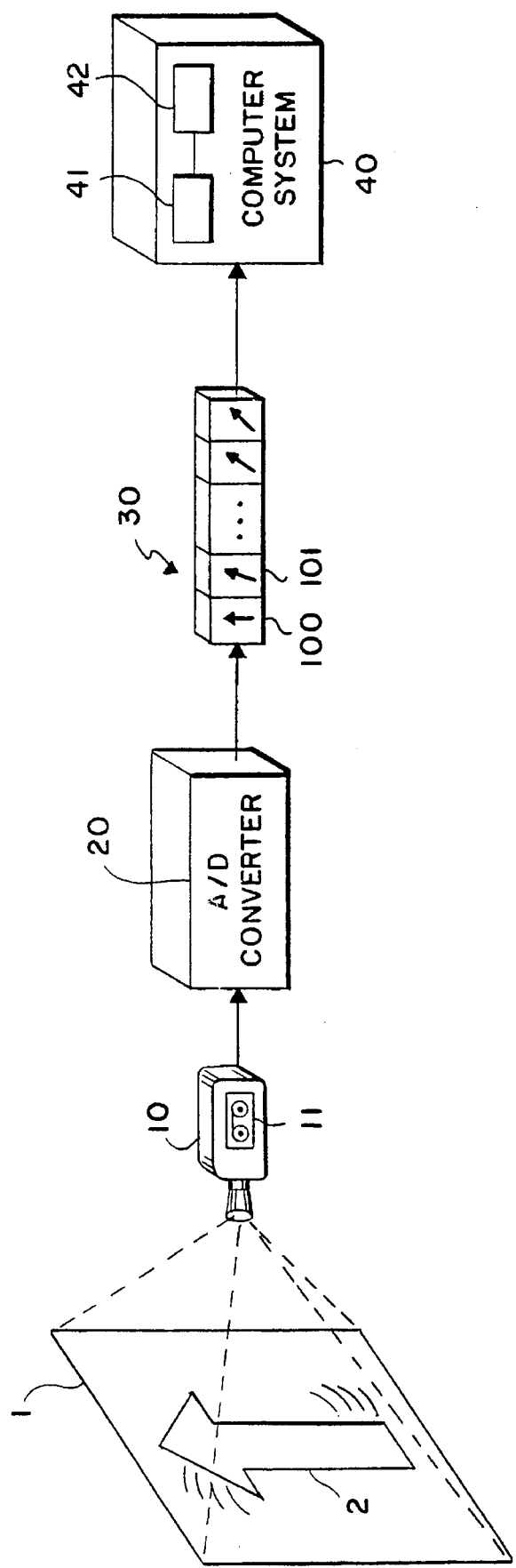
FIG. 1 is a top level schematic diagram of an image processing system which can use the invention.

FIG. 1 shows a system which may embody the invention for analyzing an image such as a scene 1 including a moving arrow 2. The scene 1 may be recorded by a camera 10 onto a film 11 as a sequence of frames representing instantaneous spatio-temporal expressions of the optical flow of the scene 1. Alternatively, the camera can record the scene 1 directly in digital form. It should be understood that the invention can also be worked with many other types of imaging systems, including video recorders, medical scanners, microscopes and remote sensing systems.

The frames of the film 11 can be digitized by any conventional analog-to-digital converter 20 into a temporal sequence of images 100, 101, et seq., which are stored in a storage device 30. Suitable storage medium for the device 30 may include magnetic, optical, or magneto-optical encoded tapes and disks. The stored digitized images 100, 101, and so forth, may then be processed by a computer system 40 which performs image processing, as described herein, to extract motion information.

The image processing computer system 40 may include one or more central processor units 41 and associated memories 42 for storing the digital images 100, 101 during processing. The memories 42 can also be used to store the encoded process steps that control the computer system 40 during motion analysis. The encoded process steps may be in the form of software programs designed to control the computer system so that it performs image analysis according to the principles of the invention.

Figure 2:
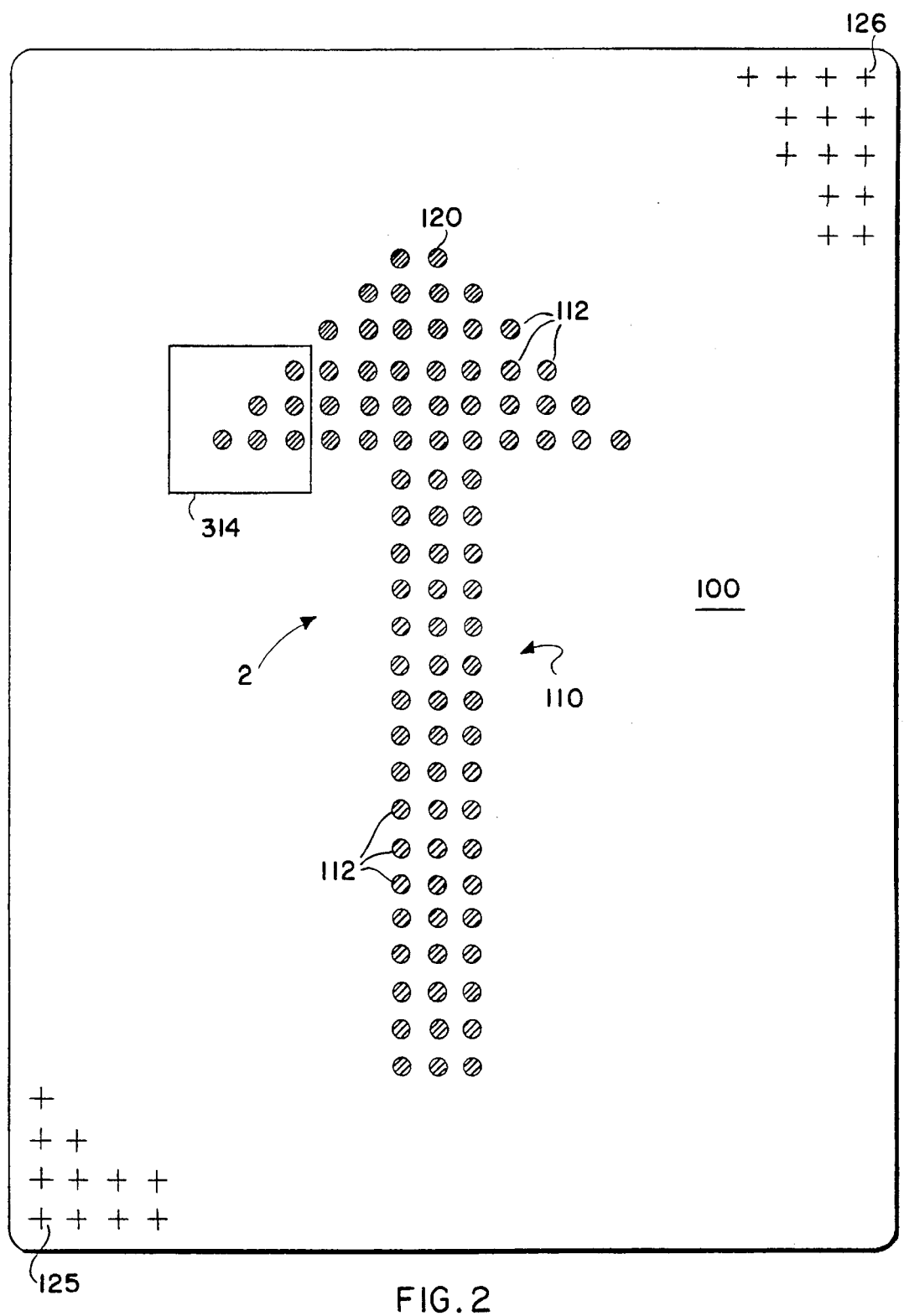
FIG. 2 is a diagrammatic view of a first image to be analyzed according to the principles of the invention.

FIG. 2 shows the scene 1 as it may be stored in digital form in the memories 42 as a first image 100. The first image 100 is stored as a first pixel grid, the first pixel grid including a first set of pixels. Each pixel of the first set of pixels is located at a predetermined spatial position in the pixel grid. Preferably, the predetermined positions are located at regularly spaced intervals in rows and columns. Each pixel has a corresponding first value representing a light intensity. Visible pixels are shown as closed dots 112, and some of the non-visible pixels are shown as the plus (+) symbol. "Non-visible pixels" are pixels have intensity values too low to perceive. One of the pixels, at the apex of an arrangement 110, is labeled by reference numeral 120. The arrangement 110 represents the arrow 2 of the scene 1 of FIG. 1. The region of the image outlined by the square labelled 314 will be explained with reference to FIGS. 3 and 4.

Typically, the pixel values are stored in the memories 42 as data. The various memory locations where the data are stored may correspond to the positions of the pixels in the pixel grid. The data of the image 100 may be pre-processed by linear and non-linear filtering techniques, for example, low-pass and band-pass filtering, and non-linear smoothing. The filtering reduce the impact of noise spikes and equalizes variations in light intensifies for different images in a sequence.

It is assumed that the values of the pixels can vary over some arbitrary gray-scale range. For example, if the grey-scale values range from 0 to 255, 0 represents no light, and 255 represents the maximum light intensity. Pixels having a zero value are not shown. Although the present invention is described with respect to half-tone images, it should be understood that the principles of the invention are equally applicable to color images.

The first image 100 can be formulated as:

$$I_i^1 = I^1(x_i, y_i) \qquad [2]$$

where the intensity values of the pixels $I^1$ the first pixel grid are indexed by the integer variable i, and the Cartesian coordinates of the pixel grid are indicated by x and y. For example, if the x coordinates of the pixels range from 0 to 511, and the y coordinates range from 0 to 1023, the not visible pixel 125 in the lower left corner of the image 100, using formula [2], could be expressed as $I_{0,0}=0$. Similarly, the non-visible pixel 126 in the top right corners is $I_{511, 1023}=0$, and pixel 120 could be expressed as $I_{255,800}=128$.

Figure 3:
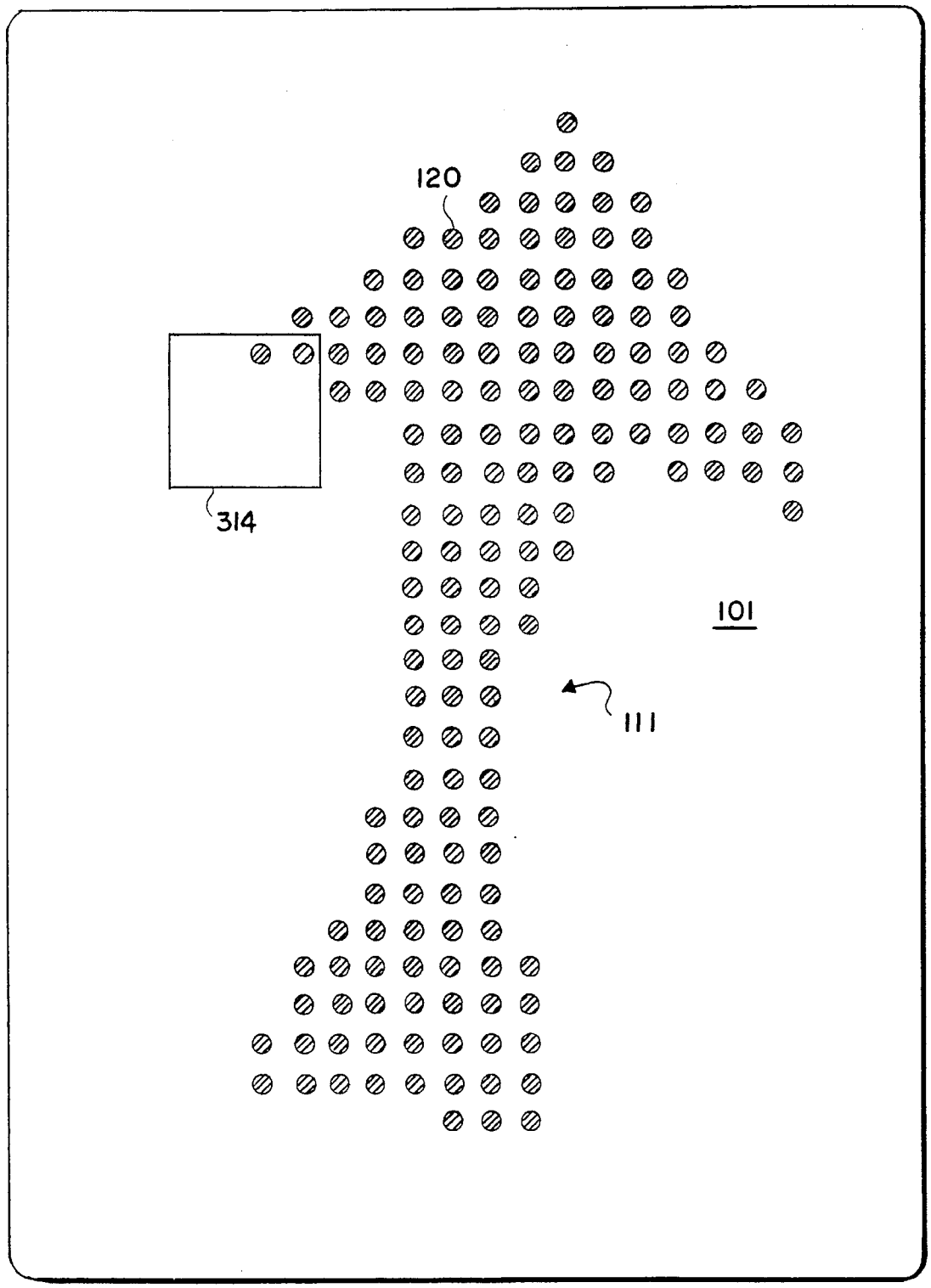
FIG. 3 is a diagrammatic view of a second image displaced in time and space from the image of FIG. 2.

FIG. 3 shows the second image 101 stored in the memories 42 as a second pixel grid 111. The second image 102 may correspond to a time and spatial displacement of the first image 100. The second pixel grid includes a second set of pixels located at positions coincident with the positions of the first set of pixels.

As shown the arrow 2 may have changed position as well as shape. Compare the relative location of pixel 120 in the arrangements 110 and 111 as shown in FIGS. 2 and 3. This re-orientation of the pixels' light intensity values may be consistent with the camera 10 "zooming" while the arrow 2 is rotating and shrinking at its waist. The second image 101, using the same form as [2] could be expressed as:

$$I_i^2 = I^2(x_i, y_i) \quad [3]$$

The amount and direction of movement, can be deduced by overlaying or "registering" the two images 100 and 101 and determining the relative displacement of pixels having like values. The relative displacement of the pixels from the first to second image can be expressed as, for example, a vector field, or some other transform indicative of the motion field.

If the motion of the images is simply planar, a single vector or affine transform can be used to describe the displacement of all the pixels. However, for the example shown, expressing the movement in the images as a single motion field is clearly erroneous. For complex motion, the direction and magnitude of the displacement may vary for different portions of the images. In general, if the set of horizontal and vertical displacements, $\{u_i, v_i\}$, of the set of pixels is expressed as:

$$\{u_i, v_i\} = \{u(x_i, y_i), v(x_i, y_i)\} \quad [4]$$

then the second image 101 could be expressed in terms of the first image and the motion or displacements field by:

$$I^2(x_i + u_i, y_i + v_i) = I^1(x_i, y_i) \quad [5]$$

In other words, the second image 101 may be synthetically "derived" from the first image 100 and the motion field. Similarly, the first image could be derived from the second image by displacing the pixels of the second image in a reverse direction, or "backwards" in time.

However, because of imaging noise, occlusion, photometric variations, and other imaging artifacts, a solution for the horizontal and vertical displacement components which exactly satisfies the "derived" to "actual" identity is impracticable, and a close approximation is all that can be achieved.

One way that the accuracy of the estimated motion field can be quantified is to calculate the average difference between the derived and actual images using a "cost function." The cost function applies the estimated motion field to each actual pixel of the second image 101 to determine a corresponding new pixel location. The values of the pixels at the new locations, e.g., the derived image, are compared with the values of the first image 100.

In order to properly account for light intensity differences in opposite directions, it is preferred that the cost function E is expressed as a sum of squared differences:

$$E = \sum_i (e_i)^2 \quad [6]$$

where $$e_i = I^2(x_i + u_i, y_i + v_i) - I^1(x_i, y_i) \quad [7]$$

represents the motion field displacement error or difference between the derived and actual image.

In terms of the motion field [4], the cost function [6] can have many local optimal solutions. The choice of methods for finding the lowest cost or best displacement estimate efficiently is what typically differentiates between various motion estimation techniques.

According to the principles of the invention, the displacement of the motion fields [4] are represented by two-dimensional splines controlled by a relatively small number of control vertices which lie on a spline control grid or mesh coupled to the pixel grid of the image. The coupling between the mesh and the image causes the pixel grid to be deformed as the control vertices are displaced. The deformation of the pixel grid, in accordance with the splines, adjusts the light intensity values according to the displaced positions of the control vertices.

Splines have traditionally been used to manipulate data which cannot be expressed as a simple polynomial. One-dimensional splines are typically used for curve fitting, the degree of curvature, at any one point, governed by the weighted contributed of control vertices which parametrize the spline. Two-dimensional splines have been used in computer graphics and photogrametry. For example splines have been used in graphic renderings to smoothly warp generated images.

In computer graphics, splines have generally been employed in conjunction with either manual or automatic feature manipulation. The innovative use of splines in the present invention of spline-based image analysis is based on manipulating light intensifies or pixel grey-scale values, which, unlike the usual spline utilizations in computer graphics, do not require feature identification.

The present invention uses two-dimensional multi-resolution splines to extract quality motion information from a sequence of images. Expressing the motion field in the form of parametrized splines enables the representation of a smooth optical flow. Some exemplary spline basis functions are described with reference to FIGS. 9–13.

Spline-based image registration has advantages over both global and local image registration techniques of the prior art. When compared with global image registration, spline-based image registration provides more degrees of freedom so that scenes with depth and/or moving objects can easily be accommodated. With respect to pure local image registration, spline-based registration has fewer free parameters to estimate, as a result fewer processing steps are required to extract motion information. In addition, the splines impose an implicit smoothness on the motion field, removing, in many instances, the need for additional smoothness constraints. By using splines, the invention cleverly blends low cost processing with high quality motion estimates.

The apparatus and method for spline-based image registration according to a first embodiment of the invention will first be described. Then in an alternative embodiment, the first embodiment is modified to enable global image registration for planar optical flow. Following, there are described other embodiments of the invention including solutions applicable to feature tracking and scenes observed through a pin-hole camera, and the specialized problem of rigid optical flow analysis. Rigid motion occurs when a camera moves through a static scene, or a single object moves rigidly in front of the camera. In yet another embodiment, the general solution will be expanded to enable multi-frame flow estimation. In multi-frame flow estimation more than two images are used to extract motion information.

Figure 4:
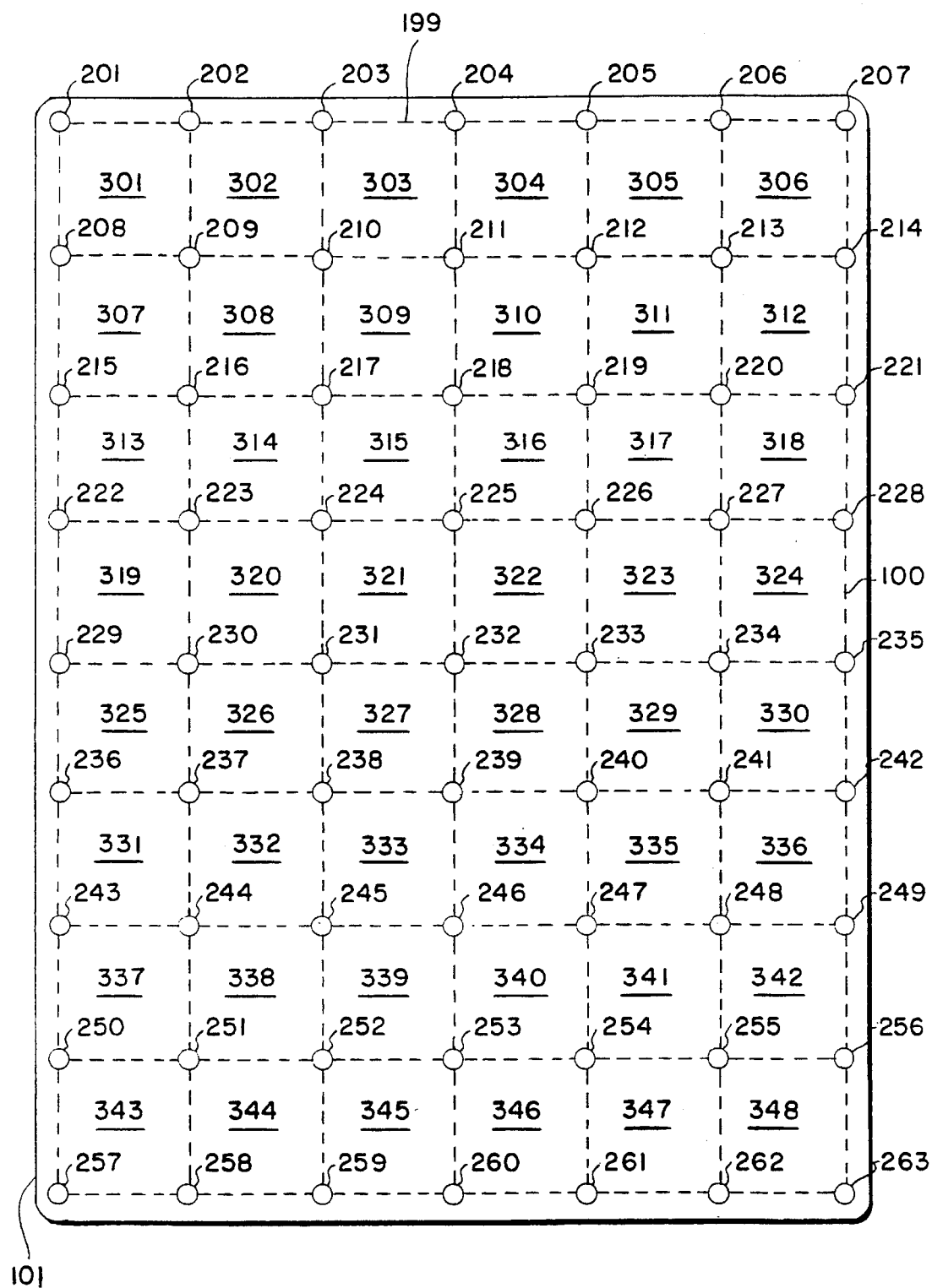
FIG. 4 illustrates a spline control grid and spline patches which may be employed in a preferred embodiment of the invention.

FIG. 4 shows a mesh or spline control grid coupled to the second image 101. The spline control grid is generally indicated by a plurality of dotted lines 199. The spline control grid 199 is governed by a plurality of control vertices 201–263 located at independently moving positions. The number of control vertices 201–263 can be selected to produce a motion estimate of a desired level of quality. In this description, and more particularly in the exemplary formulations, the various control vertices are indexed by the integer variable "j," and the positions or coordinates of the control vertices are expressed as X and Y.

For a fine-grained analysis, a large number of control vertices may be selected. A more rapid and coarser estimate of the-motion field can be produced by selecting fewer control vertices. Generally, the displacements U and V at the set of selected control vertices can be expressed as:

$$\{U_j, V_j\} = \{U(X_j, Y_j), V(X_j, Y_j)\} \quad [8]$$

For simplification purposes, in the embodiments of the invention, the control vertices 201–263 are located at regularly spaced intervals to partition the image 101 into a plurality of non-overlapping rectangular regions or "patches" labelled 301–348 in FIG. 4.

However, it should be understood, that the invention can also be worked with irregular shaped regions or patches. Or, alternatively, the image can be partitioned into fore-ground and back-ground regions so that the patches are generally aligned with the gross optical flow in different portions of the image.

If the spline control grid is a regular sub-sampling of the pixel grid, for example:

$$X_j = x_{\{m,j\}} \text{ and } Y_j = y_{\{m,j\}} \quad [9]$$

each single patch is associated with a subset of m×m pixels. In the embodiments of the invention, the size of the patches can be decreased to maximize flow detail. Increasing the size of the patches minimizes noise sensitivity. The invention can also be worked with other selections of control vertices, for example, any selection which may define the patches as a set of polygons which completely tessellate and partition the image to be analyzed.

During the image registration process, the control vertices 201–263 are iteratively and independently displaced from their original positions as will be described herein. Since the spline control grid 199 is coupled to the pixel grid, the patches 301–348 are "deformed" proportionally. As the patches 301–348 are deformed, the pixels coupled to the patches are likewise proportionally relocated, as if the pixels were attached to a sheet of rubberized material stretched by the independently movable control vertices. The adjusted light intensity values at the new location of the pixels can be computed from the splines as parametrized by the immediately adjacent displaced control vertices.

During each iteration, the quality of the estimated displacement is determined by the cost function [6]. The positions of the control vertices are then further displaced in directions and magnitudes which tend to minimize the differences in light intensities of the pixel values. After a final iteration, when the difference between the actual and derived image is less than a desired amount, the position of the control vertices parametrize the splines for the optimal solution of the motion fields.

Figure 5:
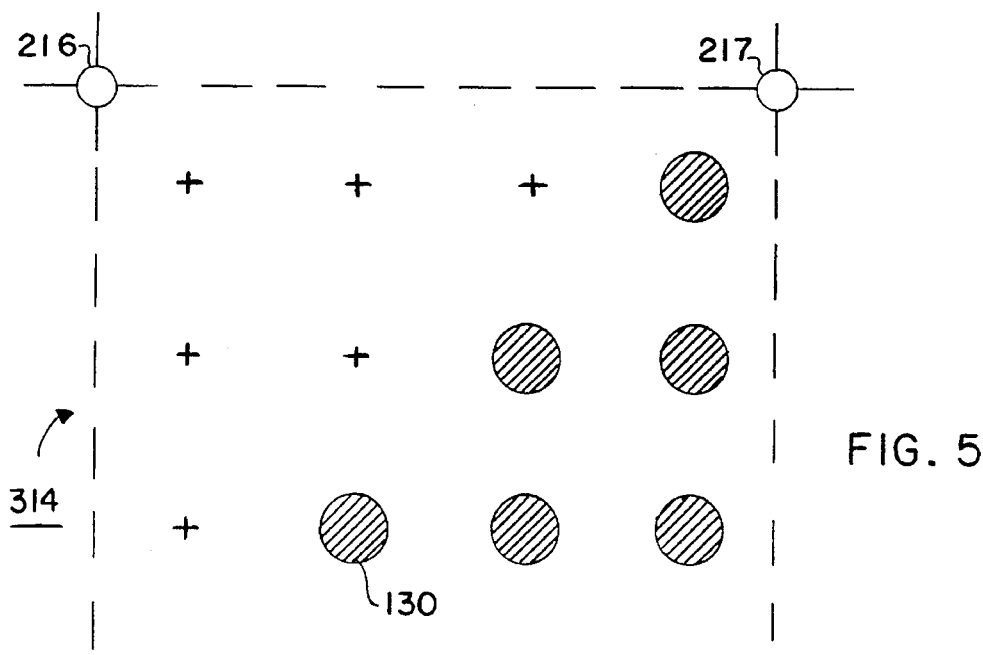
FIG. 5 is a diagram of an enlarged portion of the first image of FIG. 2.
Figure 6:
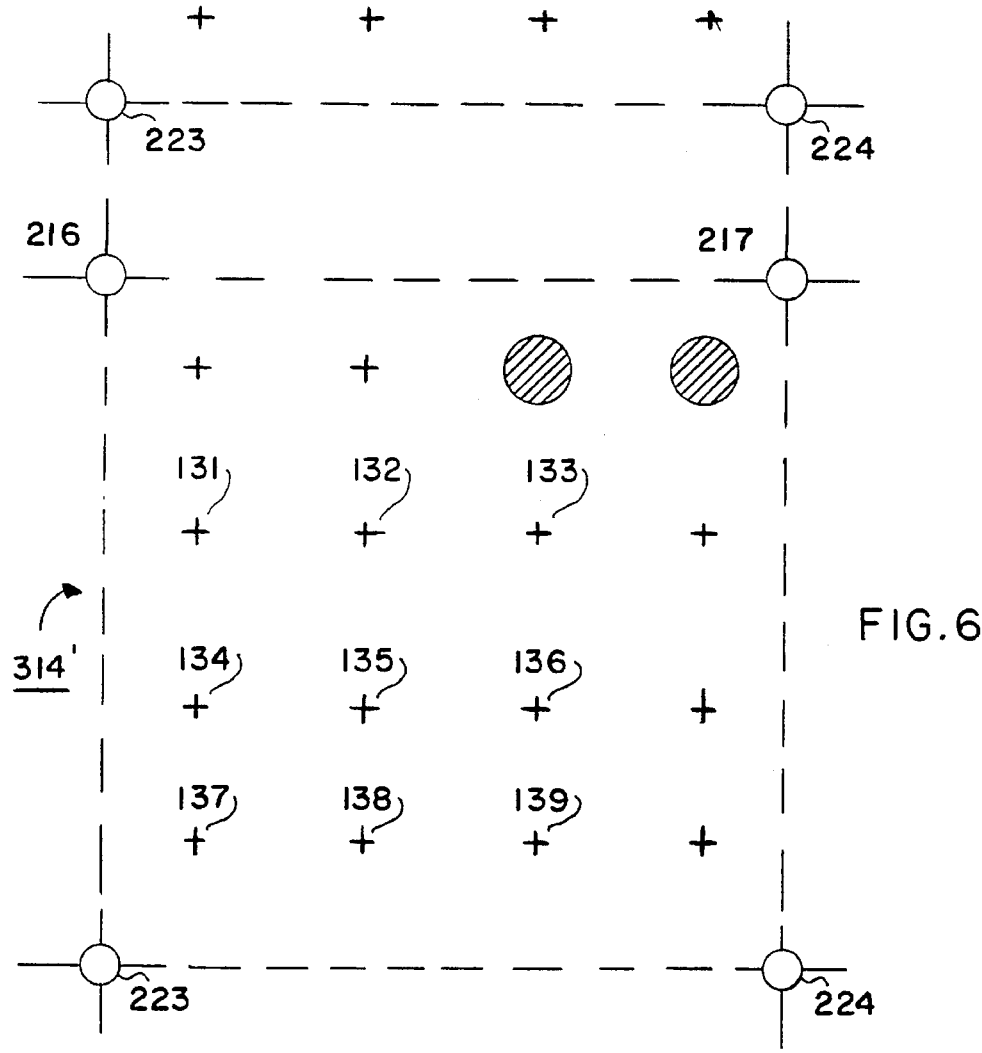
FIG. 6 is a diagram of a portion of the second image of FIG. 3 corresponding to the location of the enlarged portion shown in FIG. 5.

FIGS. 5 and 6 show an enlargement of a patch 314 of the first and second images 100 and 101, respectively. For a particular pixel, for example pixel 130, at a predetermined position of the first image 100, assuming initially a zero motion field or no displacement, a corresponding derived value is determined. The derived value corresponding to the pixel 130 can be computed by first locating the coincident position in the second image 101. Then, by interpolating (re-sampling) some or all of the values of immediately adjacent pixels of the second image, for example pixel 131–139 of FIG. 6, the derived value corresponding to the pixel 130 can be computed. The interpolation can be, for example, bi-linear.

For each patch, such as patch 314, the derived values can be compared with the actual values using the cost function [6]. Subsequently, the control vertices 201–263 can be displaced in a direction and magnitude which tends to minimize the cost, or motion estimation error.

The correction to the displacement of a control vertex in the horizontal direction can be determined by computing the differences in light intensity values of pixels adjacent along the x-axis (x-gradient). The vertical component of the connection to the displacement can be determined from the difference between pixels adjacent along the y-axis (y-gradient).

Some of the control vertices, in portions of the image where the motion field is greater, may be displaced farther than control vertices in portions of the image where the motion field is negligible. In the embodiments of the invention, a gradient descent technique is used to determine the direction and magnitude of the displacement of the control vertices. The gradient descent method maximizes the speed at which the cost function is minimized.

Figure 7:
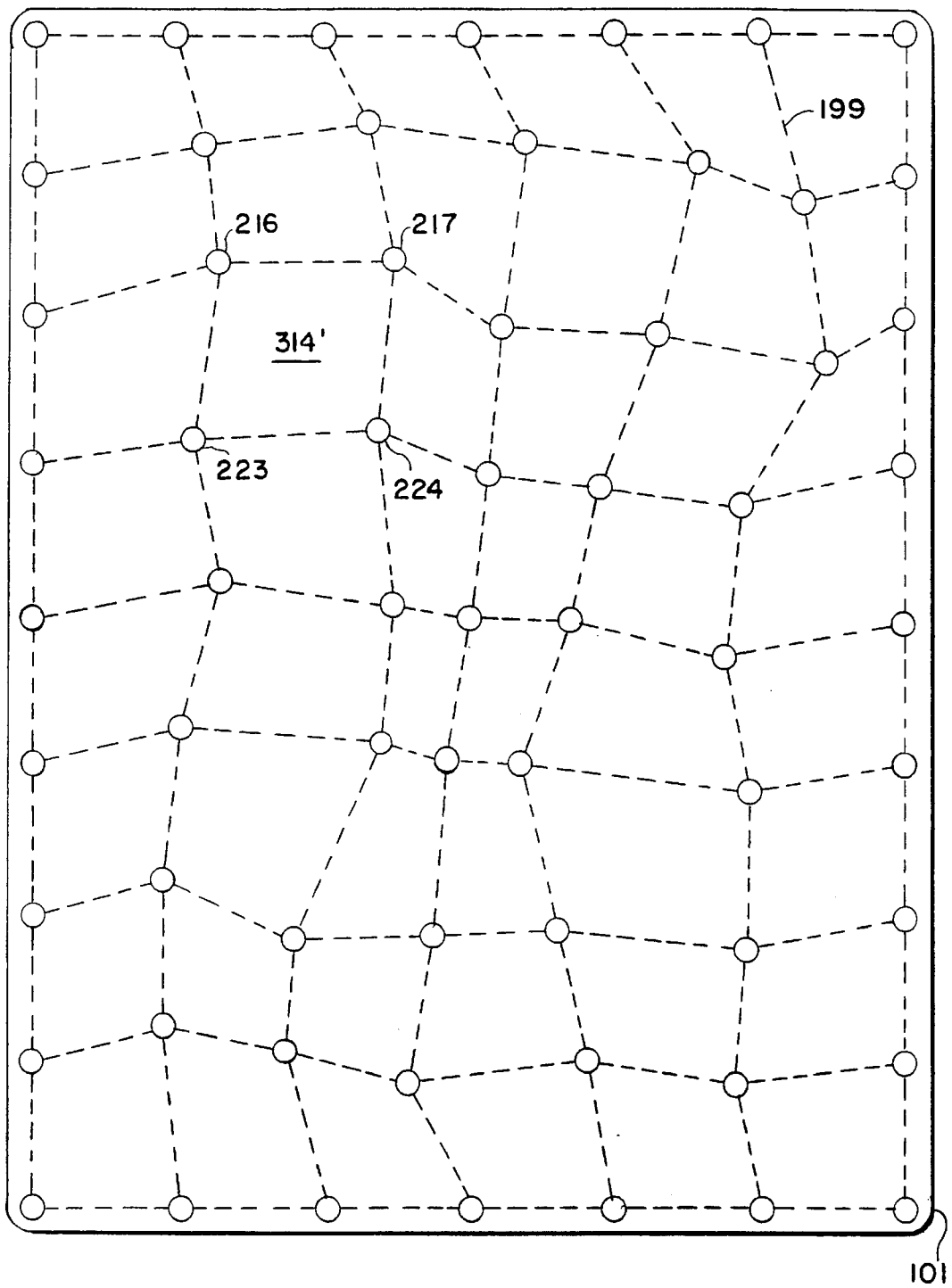
FIG. 7 illustrates the spline control grid of FIG. 4 with displaced control vertices and deformed patches.

FIG. 7 illustrates a possible arrangement of the control vertices to deform the spline control grid 199 in a way which makes the pixels of the first image 100 agree more closely with the pixels of the image derived from the second image 101. Patch 314' is the deformed patch 314 of FIG. 4 with the control vertices 216, 217, 223, and 224 individually displaced to new positions.

Figure 8:
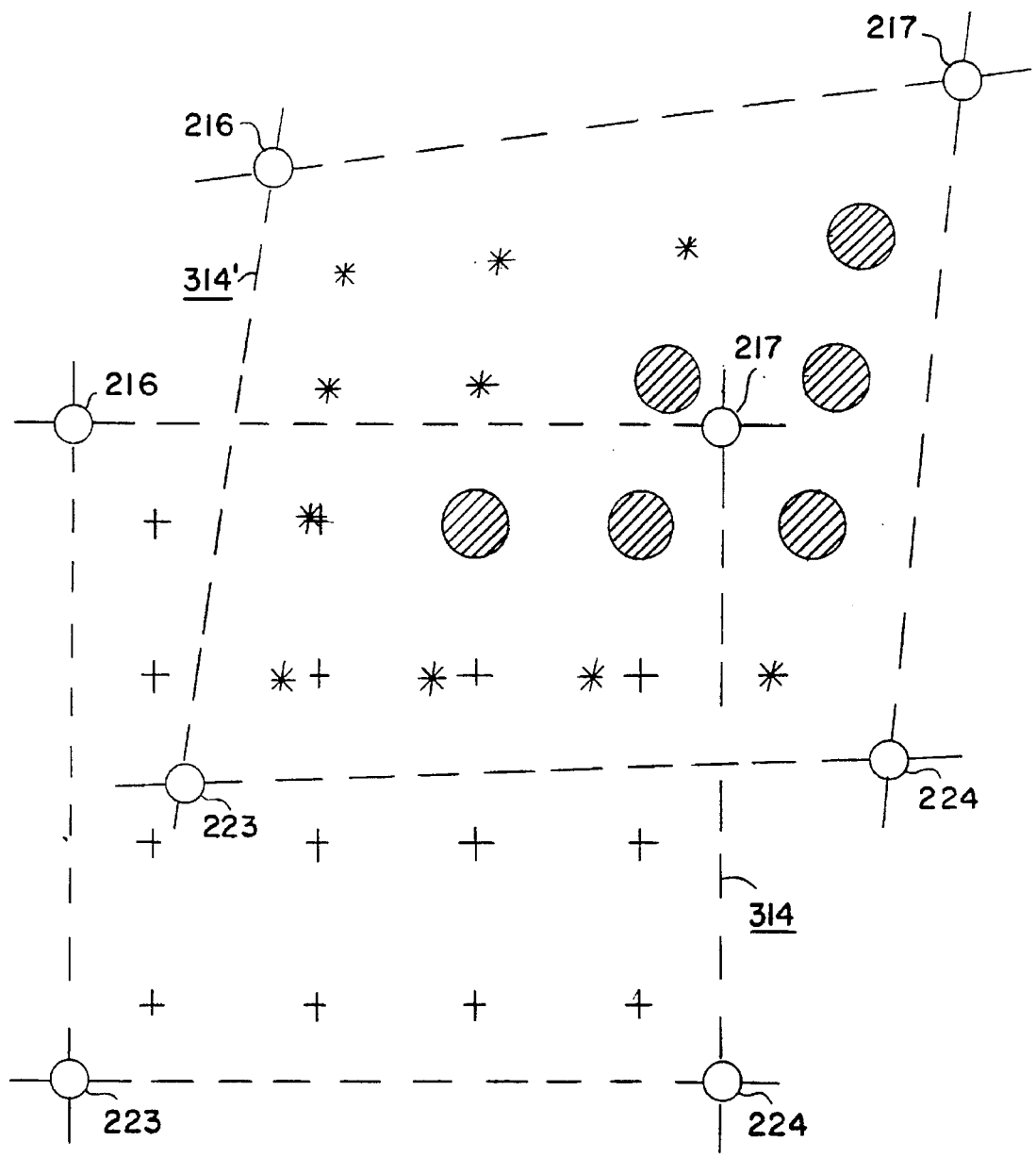
FIG. 8 is a diagram of the enlarged portions of FIG. 5 and 6, superimposed, after displacement of the control vertices as shown in FIG. 7.
Figure 9:
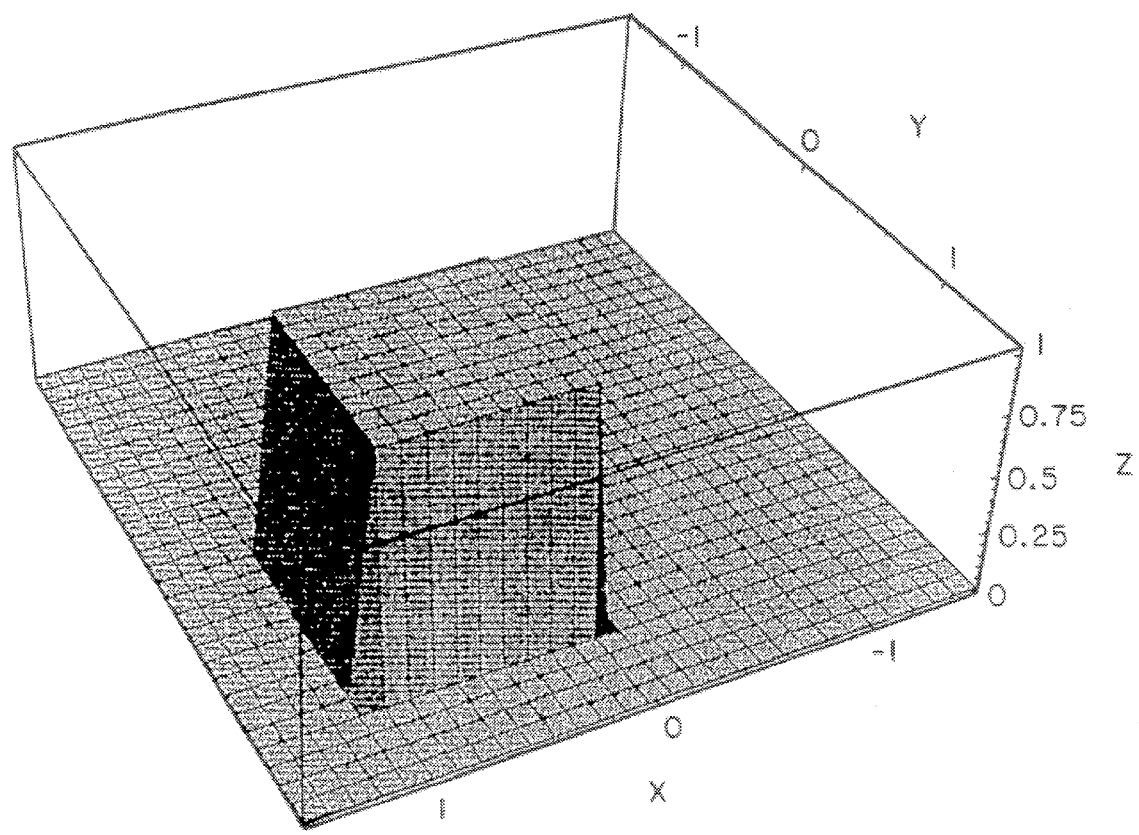
FIGS. 9–13 are three-dimensional views of spline basis functions which may be utilized by the invention.
Figure 10:
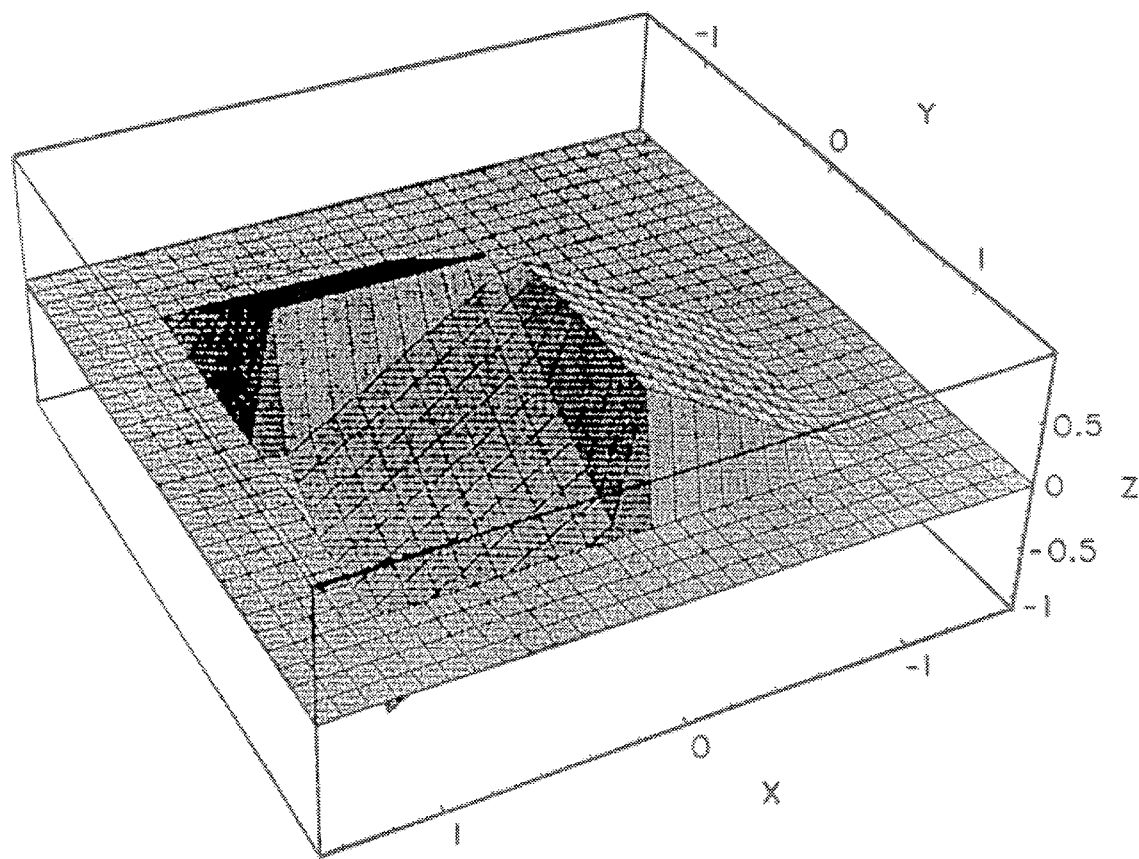
Figure 11:
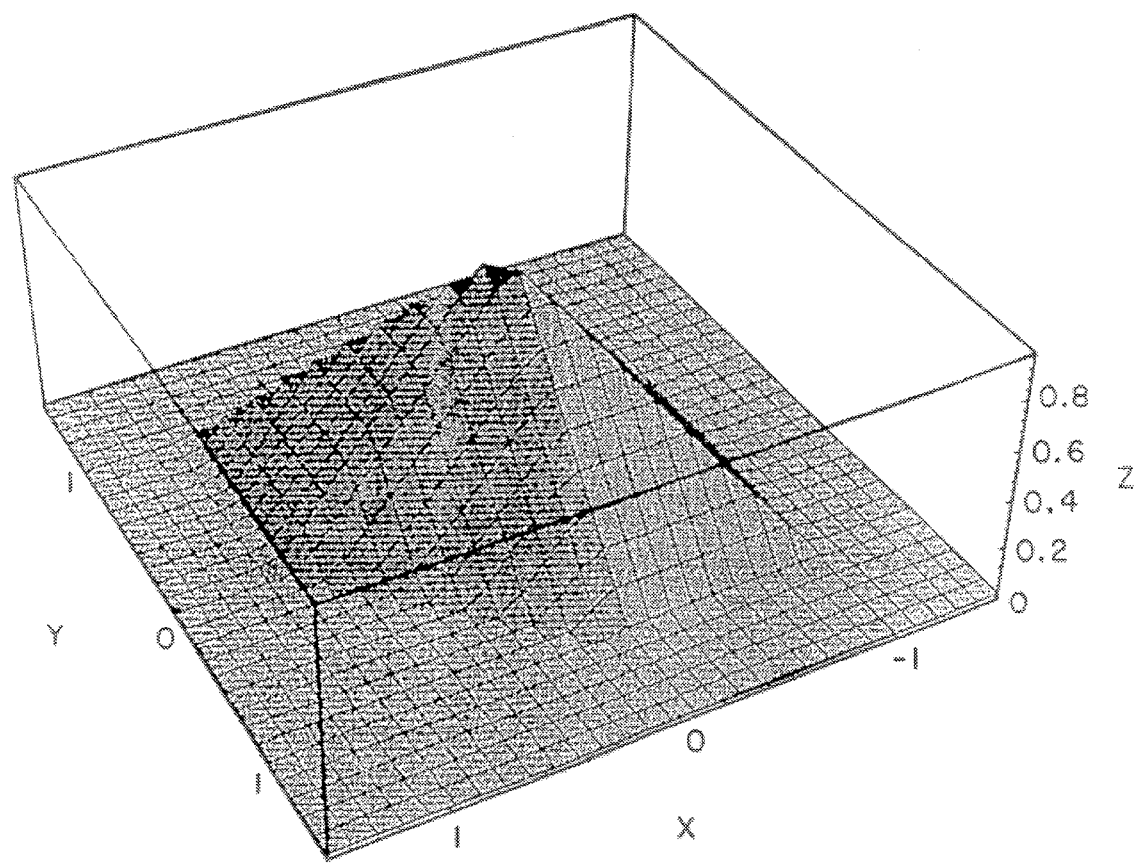
Figure 12:
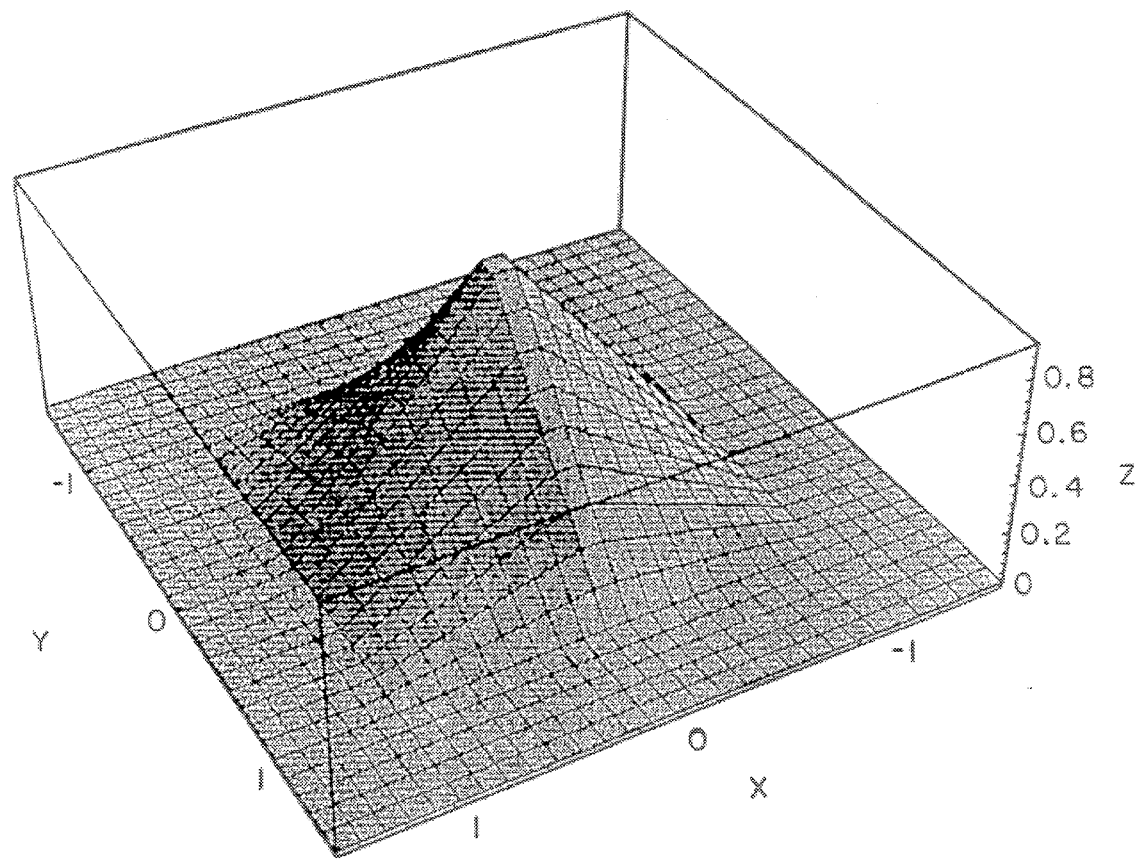
Figure 13:
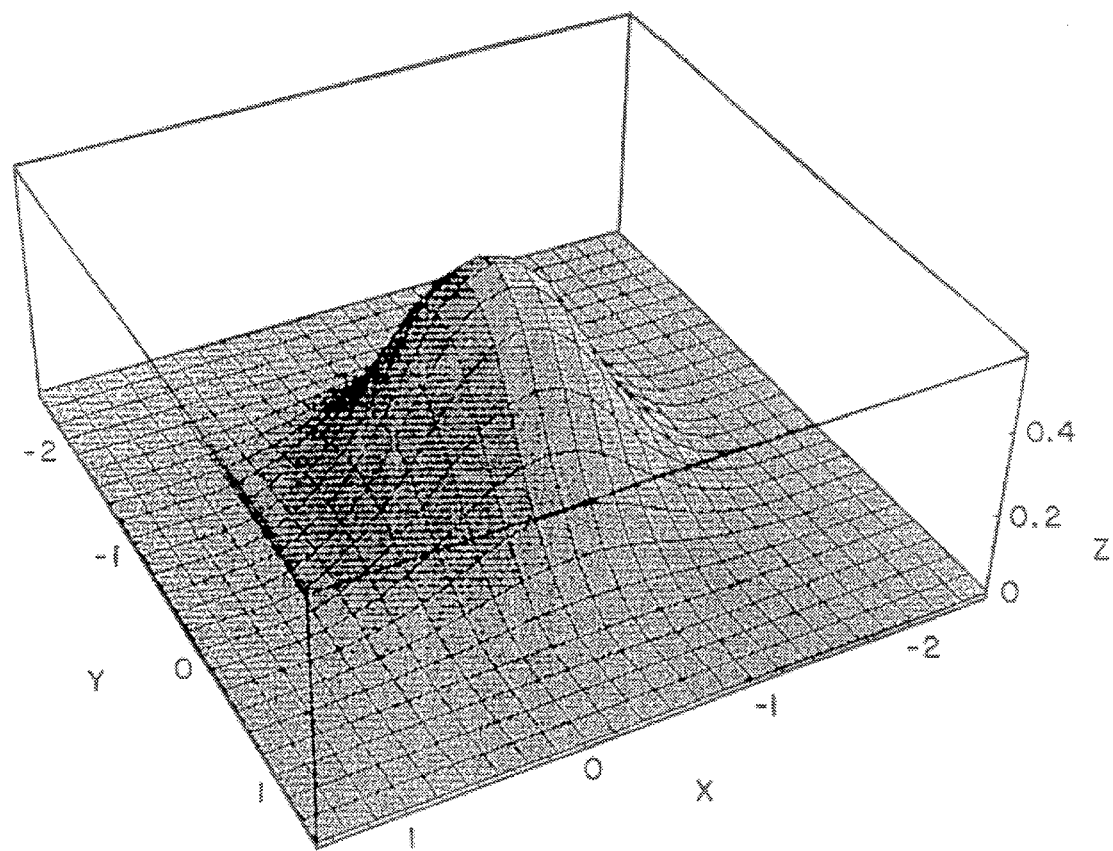

More specifically, FIG. 8 shows a deformed patch 314' superimposed on the undeformed patch 314. As the patch is deformed from its original shape, the pixels coupled to the patch are likewise relocated. In the deformed patch 314', the relocated non-visible pixels are indicated by the asterisk (*) symbol.

Generally, the horizontal and vertical displacement of any pixel i can be expressed in terms of the displacements U and V of the control vertices, and the spline basis functions B as:

$$u_i = u(x_i, y_i) = \sum_j U(X_j, Y_j) B_j(x_i, y_i) \quad [10]$$

and $$v_i = v(x_i, y_i) = \sum_j V(X_j, Y_j) B_j(x_i, y_i) \quad [11]$$

where $$B_j(x_i, y_i) = w_{\{ij\}} \quad [12]$$

The basis values $w_{\{ij\}}$, sometimes called the weights are used to form linear combinations of the control vertices displacements, see [9]. This has the advantage that a single set of weights need only be stored for all of the patches. For example, to determine the basis values for a 4 by 4 bi-linear basis grid, we use the bi-linear formulation [16] below, with x and y evenly spaced at intervals of ⅛, ⅜, ⅝, and ⅞, since the grid coordinates, or control vertices lie between the pixels. The matrix of weights, expressed as one sixty-fourths, is given in Table 1 for an example 4×4 patch of pixels and a control vertex at the upper right corner of the patch.

TABLE 1

| 7 | 21 | 35 | 49 |
|---|----|----|----|
| 5 | 15 | 25 | 35 |
| 3 | 9  | 15 | 21 |
| 1 | 3  | 5  | 7  |

In the preferred embodiment of the invention, the basis functions are spatially shifted version of each other, e.g., $$B_j(x_i,y_i)=B(x_i-X_j,y_i-Y_j) \quad [13]$$

and have finite support. Finite support means they are non-zero over a small interval.

FIGS. 9–13 show the three-dimensional graphs of five possible splines or basis interpolation functions which can be used to relocate control vertices. The x and y coordinates of the graphs, with respect to the origin (0,0) represent the relative distance between the pixel and an adjacent control vertex, and the z coordinate indicates the proportional amount to be used to adjust light intensity value of the pixel. The five basis functions, block, linear, linear on sub-triangles, bi-linear, and quadratic can be respectively expressed as:

$$B(x,y) = 1 \text{ on } [0,1]^2 \quad [14]$$

$$B(x,y) = \begin{cases} (1-x-y) \text{ on } [0,1]^2 \\ (x+1) \text{ on } [-1,0]*[0,1] \\ (y+1) \text{ on } [0,1]*[-1,0] \end{cases} \quad [15]$$

$$B(x,y) = \max(0,1 - \max(|x|,|y|,|x+y|)) \quad [16]$$

$$B(x,y) = (1 - |x|)(1 - |y|) \text{ on } [-1,1]^2 \quad [17]$$

$$B(x,y) = B_2(x)B_2(y) \text{ on } [-1,2]^2 \quad [18]$$

where $B_2(x,)$ and $B_2(y)$ are the B-splines.

The use of spline-based image registration for general flow estimation will now be described. In order to recover the spline-based flow parameters, the localized error E, as determined by the cost function [6], must be minimized with respect to the control vertices displacement parameters [8]. This is done by computing the rate of change or "gradient" of E with respect to each of the displacements $U_j$ and $V_j$.

The horizontal and vertical flow gradients can be expressed as:

$$g_j^U = \frac{\partial E}{\partial U_j} = 2\sum_i e_i G_i^x w_{\{ij\}} \quad [19]$$

and $$g_j^V = \frac{\partial E}{\partial V_j} = 2\sum_i e_i G_i^y w_{\{ij\}} \quad [20]$$

where $e_i$ is the intensity difference at each pixel i as in [7] above, and $$\{G_i^x, G_i^y\} = \nabla I^2(x_i+u_i, y_i+v_i) \quad [21]$$

is the intensity gradient of the light intensifies of the derived image, and $w_{\{ij\}}$ are the sampled values, for example Table 1, of the spline basis functions [12].

The intensity gradients can be determined by first forming the displacement vector for each pixel using [10, 11], applying the weighted values [12], determining the resampled intensity values and gradient values, and evaluating cost function [6].

The minimal value of the cost function can be determined by adjusting the displacements of the control vertices by a small amount in the direction which will minimize the differences in light intensifies. The horizontal and vertical gradients of the light intensities of the derived image can be used to determine the direction. After the displacing the control vertices, the cost is determined again, and this process is repeated for multiple iterations until the cost has a desired minimum.

Instead of incrementally displacing the control vertices, faster convergence to a minimum cost can be achieved by spatially differentiating the light intensity gradient over the derived image. The gradient can be determined by computing the rate of change of the cost function, e.g. taking the second derivative of [19 and 20] as the control vertices are displaced. The rate of change of the difference is then used to determine the magnitude of the displacement in order to converge on the minimum with fewer iterations.

Figure 14:
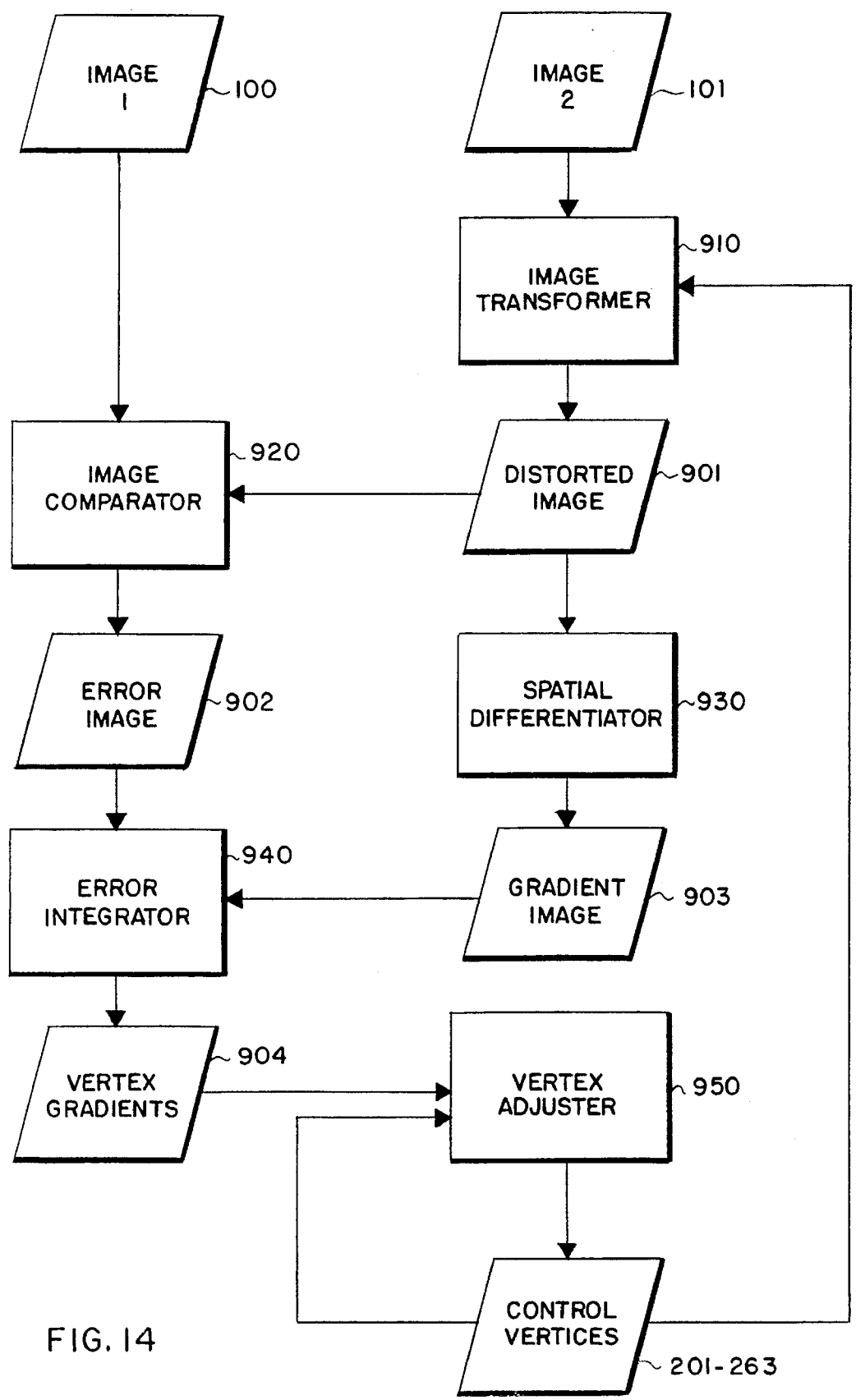
FIG. 14 is a top level block diagram of the method and apparatus for extracting motion information according to a preferred embodiment of the invention.

FIG. 14 abstracts the basic functional elements (rectangles) and data structures (rhomboids) which can be used to embody the invention. The functional elements include an image transformer 910, an image comparator 920, a spatial differentiator 930, an error integrator 940, and a vertex displace 950.

The data structures processed by the functional elements include a first image 100 and a second image 101. Control vertices 201–263 are used to parametrize the motion field of the images. In addition, during intermediate processing steps, a derived image, 901, an error image 902, a gradient image 903, and vertex gradients 904 are generated.

The image transformer 910 receives as input two data structures. The first data structure includes the light intensity values or pixels of the second image 101. The second data structure includes the location or coordinates of the control vertices 201–263.

The image transformer 910 adjusts the light intensity values of the second image 101. Adjustment of the light intensity values is proportional to the distance between the pixels and the control vertices. The proportional adjustment is expressed as a spline function. The image transformer 910 produces, as an output data structure, a derived image 901.

The image comparator 920 receives as input the first image 100 and the derived image 901. The light intensity values of these two images are compared, and the difference between the first image 100 and the derived image 901 is expressed as the error image 902.

The derived image 901 is also provided to a spatial differentiator 930 for determining gradients of the light intensity values over the derived image 901. These gradients are expressed as a gradient image 903.

The error integrator 940 receives as input the error image 902 and the gradient image 903. The integrator applies the gradient image to the error image to determine the horizontal and vertical vertex gradients 904 at each of the control vertices 201–263.

A vertex displacer 950 receives as input the vertex gradients 904 and the current coordinates of the control vertices 201–263. The displacer 950 displaces the control vertices 201–263 by amounts proportional to the vertex gradients 904.

The displaced control vertices can be used to further transform and adjust the light intensity values of the second image in subsequent processing cycles until the derived image 901 is in substantial agreement with the first image 100. When the difference between first image and the "derived" second image is minimal, the coordinates of the control vertices substantially parametrize the motion field.

For large displacements, which are very expensive to compute, the coordinates of the control vertices should be initialized near the vicinity of the correct solution. Fortunately, rough estimates of large displacements can just as well be estimated from a coarse resolution version of the images having fewer pixels. Information from fine resolution images can then be used to improve the accuracy of the rough estimation, as described below.

Not only is it efficient to ignore information from fine resolution images when estimating large displacements, in many cases it is necessary to do so to escape from local minima. Portions of the image representing high speed optical flow may undergo a phenomena which is known as aliasing. Aliasing can be the source of false matches where corresponding or equivalent solutions exist at local minima. Since the general method tends to converges to a local minimum, multi-resolution displacement estimation helps to eliminate the likelihood of false matches.

An effective way to do this is to use a set of multi-resolution images in a coarse-to-fine fashion. Each successively coarser image, with smaller discrete flow fields, is a blurred and sub-sampled version of a finer resolution image.

Figure 15:
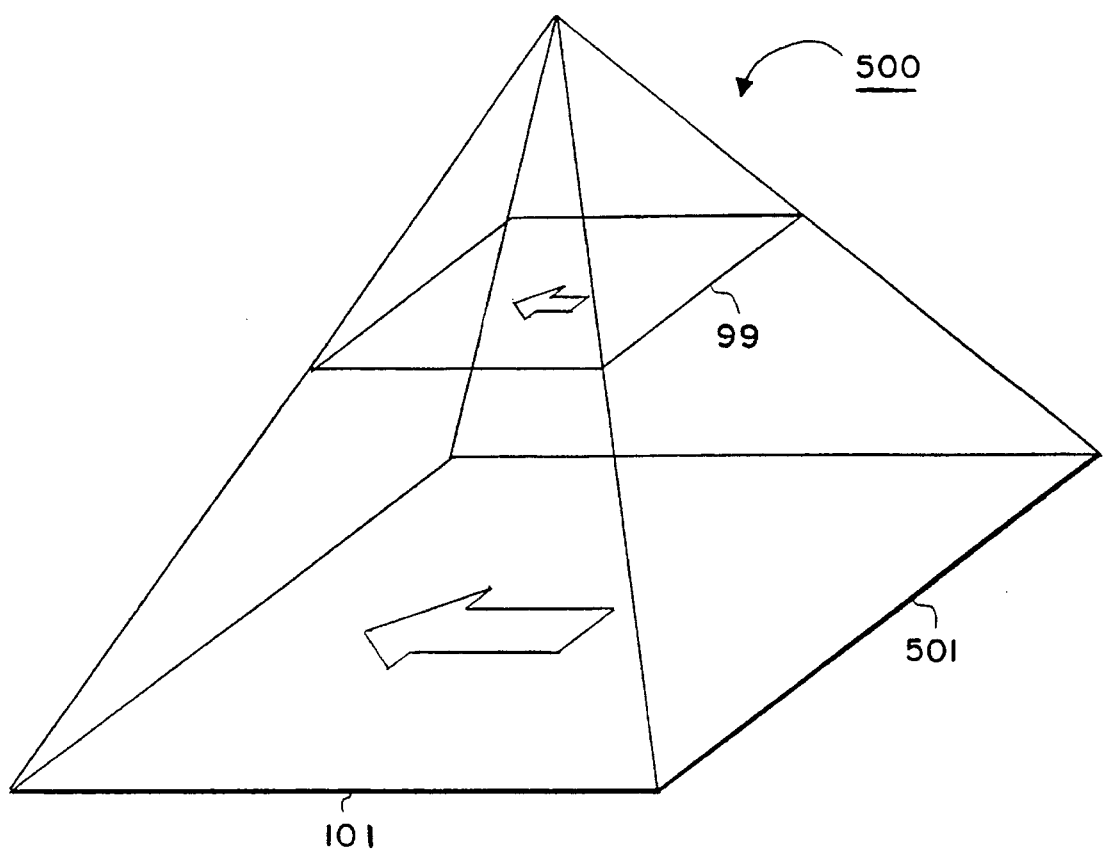
FIG. 15 is a perspective diagram of a Gaussian pixel pyramid having coarse-to-fine image planes.

FIG. 15 shows a multi-resolution pixel pyramid 500 having a base 501. The pyramid 500, beginning with the second image 101 as the base 501, is constructed by an iterated box filter technique which collapses and blurs pixel values to create higher co-planar levels of the Gaussian pyramid 500. The pixel values at higher levels of the pyramid 500 represent larger and coarser portions of the base image 101.

In order to decrease the processing cost for estimating large displacements, e.g., high speed optical flow, the general method is first applied to a selected reduced size coarse image 99. The reduced size coarse image 99 includes fewer pixels. Therefore, fewer processing steps are required to extract coarser displacements. Next, a lower or finer level of the pyramid 500 is selected, perhaps the base image 101. The magnitude of the coarser displacements are increased by a factor proportional to the coarse-to-fine image sizes. The coarser displacements can then be used to initialize a finer flow estimate at the lower level of the pyramid 500. In the preferred embodiment, the spline patches are sized to include 16×16 pixels, and the pyramid has three levels.

In an alternative embodiment of the invention, the spline-based image registration technique is adapted to solve the problem of global or planar motion estimation. In many image analysis applications, a single global description of the motion field may suffice. Two example applications are the registration of images of flat scenes, and the coarse registration of slices of volumetric image data typically used to represent three-dimensional objects.

For flat scenes, for example, documents, walls, or two-dimensional images, the flow field usually has a simple parametrization in terms of a small number of global parameters. For example, the motion may be pure translation, two-dimensional rigid motion, scaled two-dimensional rigid motion, etc.

Therefore, in planar optical flow, e.g. the optical flow resulting from the motion of a planar surface, a single global description of the motion model may suffice. A simple example of such global motion is an affine flow where the pixel displacements [4] can be represented as:

$$u(x,y)=(m_0 x+m_1 y+m_2)-x \qquad [22]$$

and $$v(x,y)=(m_3 x+m_4 y+m_5)-y \qquad [23]$$

and where $$m=(m_0,m_1,m_2,m_3,m_4,m_5)^T \qquad [24]$$

are the time-based global motion parameters, and T is the transpose operator.

To compute the global motion parameters using splines, the positions of the spline control vertices are initially selected according to the terms of the motion parameters m. In vector notation, the motion parameters for the horizontal and vertical component of the control vertices displacements can be expressed as:

$$\begin{bmatrix} U_j \\ V_j \end{bmatrix} = \begin{bmatrix} X_j & Y_j & 1 & 0 & 0 & 0 \\ 0 & 0 & 0 & X_j & Y_j & 1 \end{bmatrix} m - \begin{bmatrix} X_j \\ Y_j \end{bmatrix} \qquad [25]$$

Then, the position of the relocated pixels can be determined by the general spline-based flow estimation technique as described above. For affine, or simpler flow, for example, pure translation, translation and rotation, or translation plus rotational and scale (zoom), the technique produces the correct flow at each pixel for both linear and bi-linear splines. Therefore, global or planar estimation can be performed with a single spline patch.

The gradient simply becomes:

$$g_m \equiv \frac{\partial E}{\partial m} = \sum_j \frac{\partial U_j}{\partial m} \frac{\partial E}{\partial U_j} + \frac{\partial V_j}{\partial m} \frac{\partial E}{\partial V_j} \qquad [26]$$

Another embodiment of the invention enables spline-based feature tracking. Feature tracking attacks the problem of extracting motion information from a sequence of images depicting an object rigidly moving through a static scene. Feature tracking using spline-based registration is an alternative to traditional iconic or pixel-based optical flow analysis.

Figure 16:
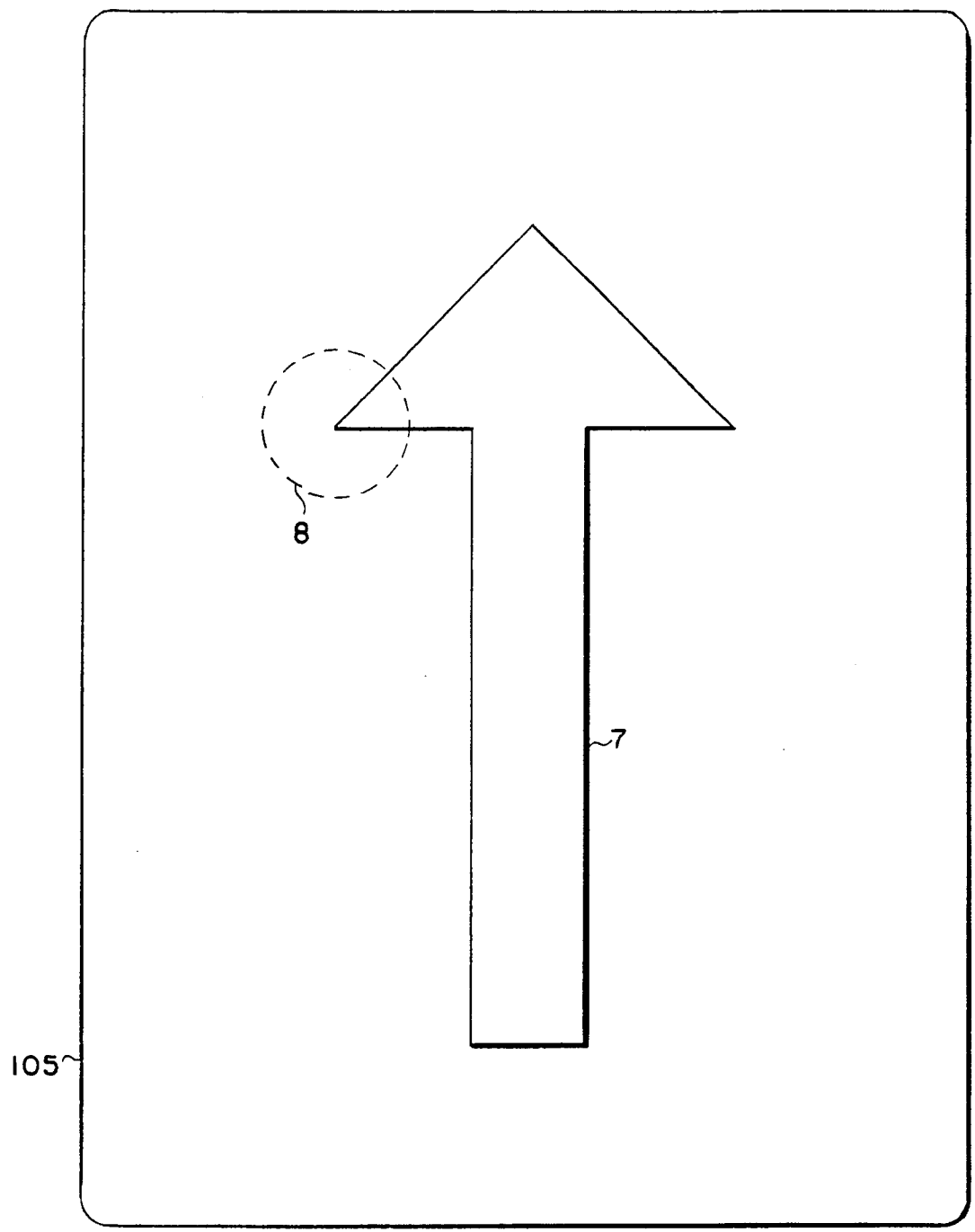
FIG. 16 is a diagram of an image showing a moving feature to be analyzed by an alternative embodiment of the invention.

With reference to FIG. 16, imagine the arrow 7 in the foreground rigidly flying through the back-ground of the scene 105. The adaptive feature tracking technique, according to the principles of the invention, applies the general technique to a readily identifiable local areas of interest, corners, points, or lines, for example, a fore-ground region 8 outlined by a broken line.

In order to perform spline-based feature tracking, the positions of the control vertices can be initially selected so that there is less uncertainty in the horizontal and vertical motion components. This technique has the advantage of requiring less computational steps and being less sensitive to variations in light intensities in the area of the tracked feature. Additionally, spline-based feature tracking can smoothly handle large deformations in the patch being tracked.

As an advantage, spline-based feature tracking can be done at lower costs since the patches coupled to the feature are processed in parallel with the patches which are processed for extracting the general flow displacements of the background scene.

Figure 17:
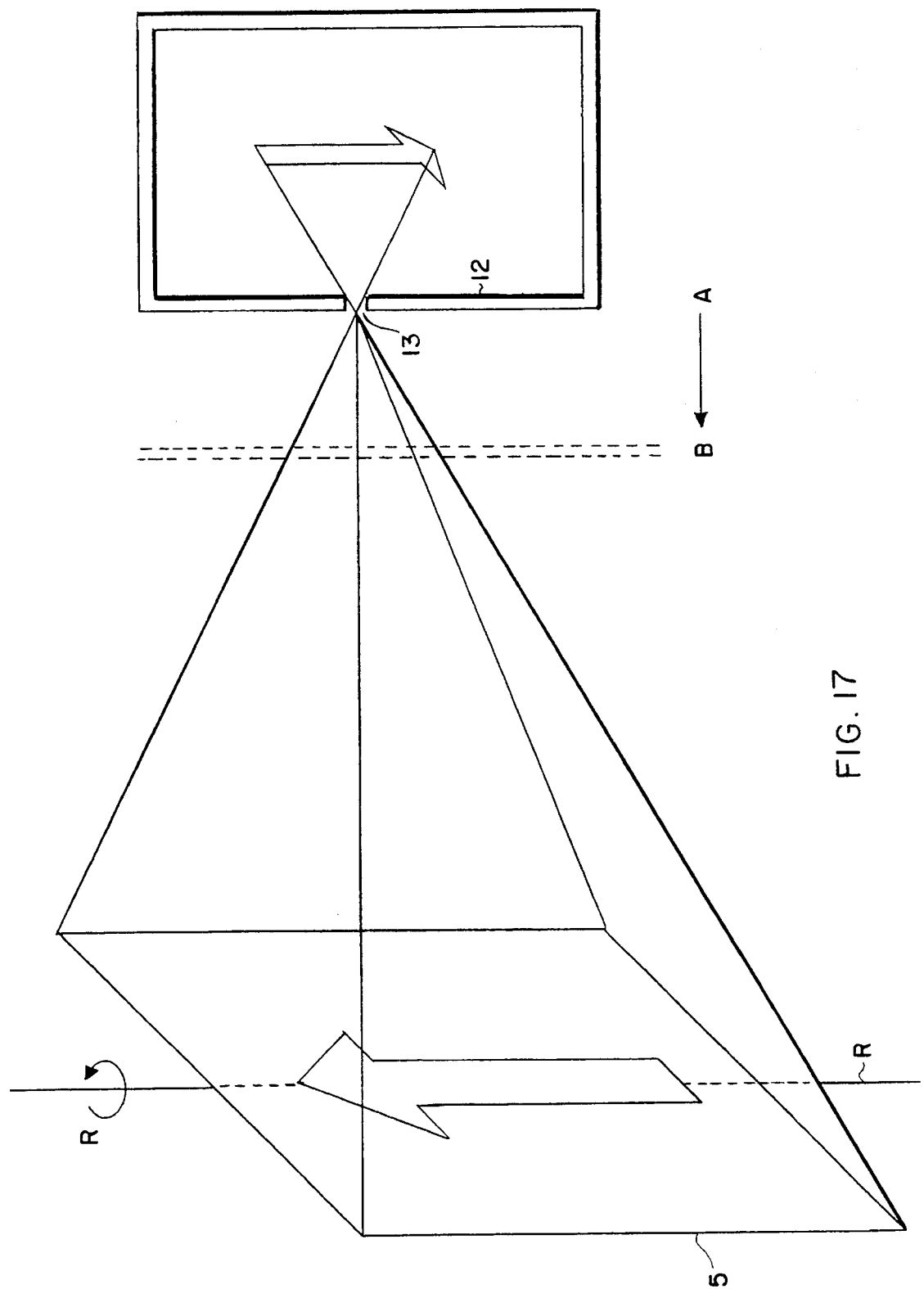
FIG. 17 is a schematic diagram of a moving scene in front of a pin-hole camera to be analyzed by another alternative embodiment of the invention.

FIG. 17 show a scene subject to perspective distortion where another embodiment of spline-based image registration can be used to an advantage. In FIG. 17, the camera 12 has a very wide-angle or pin-hole lens 13. A scene 5 is rotating about an axis R, while the distance between the scene 3 and the camera 12 is changing, for example, the camera 11 moves from position A to position B, or using modern lens technology, the camera is zooming. In this embodiment, the general optical flow or pixel displacement field [4] can be described in terms of a two-dimensional projective transformation of the image plane, for example:

$$u(x,y) = \frac{m_0 x + m_1 y + m_2}{m_6 x + m_7 y + 1} - x \quad [27]$$

and $$v(x,y) = \frac{m_3 x + m_4 y + m_5}{m_6 x + m_7 y + 1} - y \quad [28]$$

The horizontal and vertical components of the displacements of the control vertices can likewise be expressed as:

$$U_j = \frac{m_0 X_j + m_1 Y_j + m_2}{m_6 X_j + m_7 Y_j + 1} - X_j \quad [29]$$

and $$V_j = \frac{m_3 X_j + m_4 Y_j + m_5}{m_6 X_j + m_7 Y_j + 1} - Y_j \quad [30]$$

The partial derivative or gradient of the horizontal component of the displacement of the control vertices can be formulated in vector notation as:

$$\frac{\partial U_j}{\partial m} = \quad [31]$$

$$\frac{1}{D_j} \begin{bmatrix} X_j & Y_j & 1 & 0 & 0 & 0 & - & X_j N_j^U/D_j & - & Y_j N_j^U/D_j \\ 0 & 0 & 0 & X_j & Y_j & 1 & - & X_j N_j^V/D_j & - & Y_j N_j^V/D_j \end{bmatrix}$$

where $N_j^U$, $N_j^V$, and $D_j$ respectively are the current numerator and denominators of [29] and [30], and $$m = (m_0, m_1, m_2, m_3, m_4, m_5, m_6, m_7)^T \quad [32]$$

represents the motion parameters. With this modification of the affine case proceed with [26] above to determine the global gradient.

Only eight parameters are required for each image, which is equivalent to the number of parameters used by prior art techniques using quadratic flow fields. Although the motion field is no longer a linear function and exactly equivalent to true projective flow, perspective distortion can be minimized by selecting a relatively large number of control vertices to make the patches small.

As an advantage in this type of image analysis situation, spline-based motion estimation allows for arbitrary large displacements, whereas known quadratic flow techniques generally demand instantaneous or infinitesimal motion. In addition, spline-based projective flow estimation does not require a calibrated camera. Since the internal parameters of the camera do not affect the motion estimation process they need not be recovered, and in fact, the camera's parameters may vary over time. In contrast, prior art techniques generally demand stable internal camera parameters.

Figure 18:
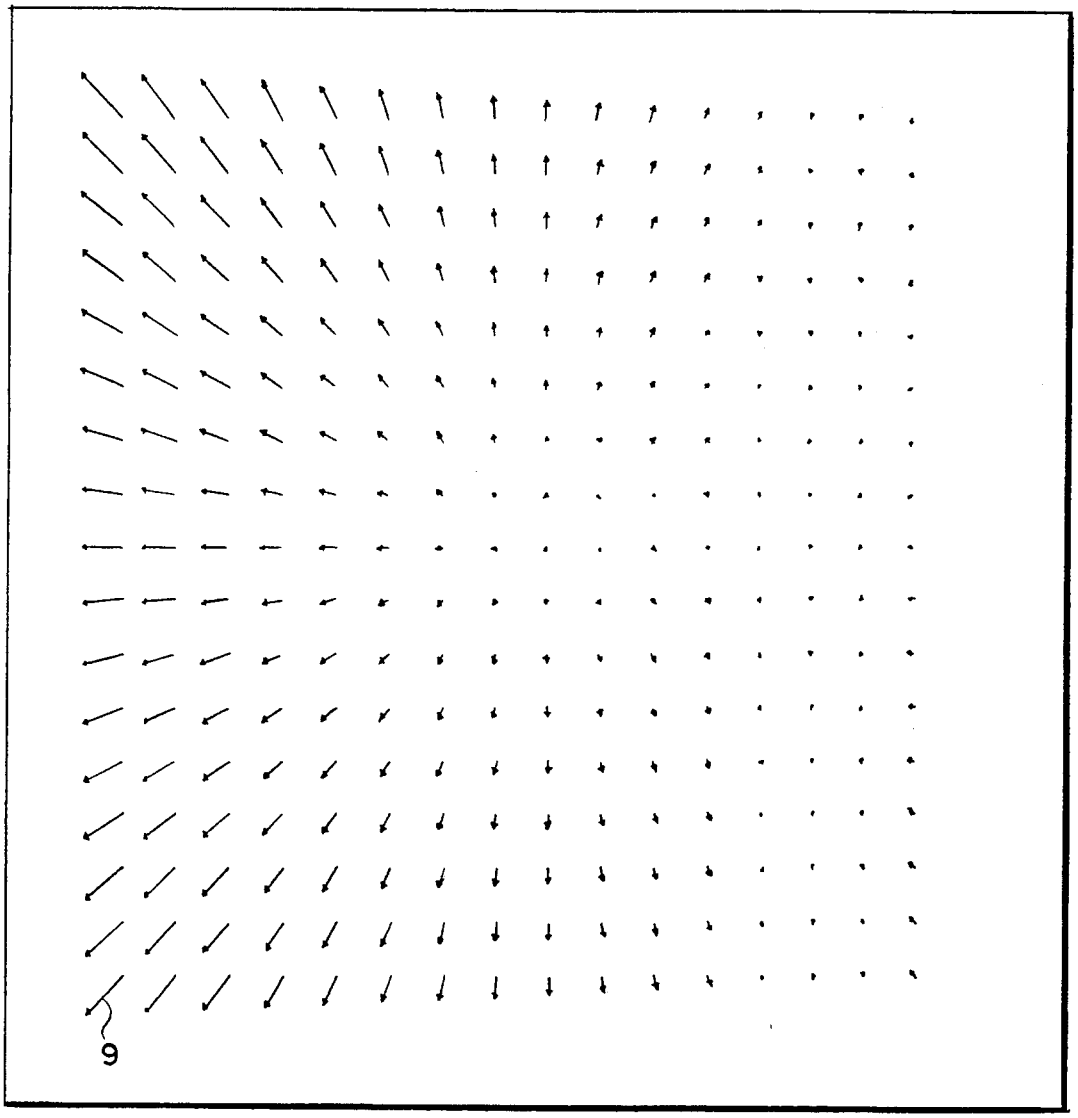
FIG. 18 is a schematic diagram of the motion fields for the image of FIG. 17 extracted according to the principles of the invention.

FIG. 18 shows the motion estimates, experimentally obtained, according to this embodiment of the invention, for the optical flow of a scene similar to the one shown in FIG. 17. Each arrow in FIG. 18 represents the optimal displacement of a corresponding control vertex. For example, the arrow labelled 9 in FIG. 18 represents the displacement vector for a control vertex corresponding to the lower left corner of the scene 5 of FIG. 17.

As is evidenced by the variety of directions and magnitudes of the arrows, spline-based motion extraction correctly handles the extraction of motion information from complex optical flows. The optical flow in each region of the scene 5 can accurately be represented by a displacement vector. Each vector has a direction and magnitude best suited for the adjacent pixels.

A special case of optical flow, which occurs often in practice, is that of rigid motion. This is when the camera moves through a static scene, or a single object moves rigidly in front of the camera. Typical "rigid motion" applications include image compositing and stereo processing of satellite images. Commonly used local motion estimation techniques are typically based on estimating the instantaneous camera egomotion given a camera centered depth. This has the disadvantage of only being valid for small camera motion, and additionally, requiring a calibrated camera. Also, there may be unresolvable sensitivity problems associated with estimating the camera centered depth. Spline-based image registration estimates projective depth rather than true Euclidian depth. The projective depth can subsequently be convened to Euclidian depth.

The general solution for the optical flow, using a projective spline-based formulation of the motion and structure, can express the pixel displacement [4] as:

$$U_j = \frac{m_0 X + m_1 Y + m_8 Z(x,y) + m_2}{m_6 X + m_7 Y + m_{10} Z(x,y) + 1} - X_j \quad [33]$$

and $$V_j = \frac{m_3 X + m_4 Y + m_9 Z(x,y) + m_5}{m_6 X + m_7 Y + m_{10} Z(x,y) + 1} - Y_j \quad [34]$$

where $Z(x,y)$ are the local shape estimates. The X, Y, and Z components of the displacement of the pixel are related to the true Euclidian coordinates of the optical flow by some three-dimensional projective transformation (collineation) which can, given enough views, be recovered from the projective depth estimates.

To compute both the global and local flow estimates, the displacement fields of the control vertices, in vector notation similar to formulation [31] can be expressed as:

$$\frac{\partial U_j}{\partial m} = \frac{1}{D_j} \begin{bmatrix} X_j & Y_j & 1 & 0 & 0 & 0 & - & X_j N_j^U/D_j & - & Y_j N_j^U/D_j Z_j 0 & - & Z_j N_j^U/D_j \\ 0 & 0 & 0 & X_j & Y_j & 1 & - & X_j N_j^V/D_j & - & Y_j N^V/D_j 0 Z_j & - & Z_j N_j^V/D_j \end{bmatrix} \quad [35]$$

The derivatives or gradients with respect to the depth estimate $Z_j$ can be formulated as:

$$g_j^Z \equiv \frac{\partial E}{\partial Z_j} = \frac{\partial U_j}{\partial Z_j} \frac{\partial E}{\partial U_j} + \frac{\partial V_j}{\partial Z_j} \frac{\partial E}{\partial V_j} \quad [36]$$

This formulation is equivalent to the following formulation $$g_j^Z = g_j^U \frac{m_8 - m_{10} N_j^U/D_j}{D_j} + g_j^V \frac{m_9 - m_{10} N_j^V/D_j}{D_j} \quad [37]$$

which expresses the rate of change of the depth estimate.

The spline-based technique using projective motion formulation requires the estimation of eleven global parameters, compared with six for prior art rigid motion formulations. However, the spline-based technique does not require a calibrated camera, and the camera can have time varying internal parameters. Spline-based motion estimation also allows arbitrary large displacements and non-uniform or irregular motion. Furthermore, spline-based image registration does not have any problems with situations in which either the global motion or local shape estimates are poorly recovered (e.g. planar scenes, pure rotation of a stationary object).

In another embodiment of the invention, a variation of spline-based image registration is used to enable multi-frame flow estimation. In many optical flow estimation applications, more than two images are used to derive local estimates of the optical flow. This is particularly true in applications such as multiple base-line stereo image matching for a set of weakly calibrated images. Using a large number of images tends to improve the accuracy of motion estimates through noise reduction. Also, multiple images can be used to disambiguate multiple like matches.

In spline-based multi-frame flow estimation, it is assumed that the optical flow is not accelerating. If the optical flow is substantially linear, the sets of displacements for temporally successive images, based on formulation [4] above can be expressed as:

$$\{(u_t(x,y), v_t(x,y))\} \qquad [38]$$

where the displacement of the pixels in each successive image is a scalar multiple of the preceding image, for example:

$$\{s_t u_0(x,y), s_t v_0(x,y)\} \qquad [39]$$

The successive images, based on [5] can be expressed as:

$$I^t(x_i + s_t u_i, y_i + s_t v_i) = I^1(x_i, y_i) \qquad [40]$$

The local displacement estimates are extracted by minimizing the cost function [6] over all of the images to be analyzed. In other words, the cost functions for all of the images are to be summed. This sum of the sum of squared differences of all of the images may be formulated as:

$$E = \sum_t \sum_i (e_i^t)^2 \qquad [41]$$

where $e_i^t$ is:

$$e_i^t = I^t(x_i, y_i) - I^1(x_i + s_t u_i, y_i s_t v_i) \qquad [42]$$

In the case of multi-frame flow estimation, the gradient functions corresponding to [19] and [20] with respect to the local displacement of the control vertices become:

$$g_j^u = 2 \sum_t s_t \sum_i e_i^t G_{ti}^x w_{ij} \qquad [43]$$

and $$g_j^v = 2 \sum_t s_t \sum_i e_i^t G_{ti}^y w_{ij} \qquad [44]$$

with $e_{ti}$ and $G_{ti}^x$ corresponding to $e_i$ and $G_i^x$, and with $I^2$ being replaced by $I^t$.

For multi-image spline-based global motion estimation two approaches can be taken. If it is assumed that there is uniform camera motion, the motion parameters over time, see [24], are related by a known transform. Alternatively, an independent motion estimate can be extracted for each successive image.

The latter approach may be of particularly useful in multi-frame mosaicing or image compositing applications, where it is desired to generate a single larger image from multiple images taken at different orientations and times. The motion estimation problem in this case simply decomposes into a set of independent spline-based estimation problems.

A variation of spline-based multi-frame image registration can be used for mixed global/local motion estimation. To provide a solution for this technique, it is assumed that the global motion parameters [32] for each frame or image are independent of one and another, and it also assumed that the local shape parameters $Z_j$ are constant over time. This situation exists in a multi-frame uncalibrated stereo matching application when multiple arbitrary images are captured of a rigid three-dimensional scene.

In conclusion, the spline-based image registration techniques disclosed herein could, in part, be characterized as a hybrid of the global and local motion estimation techniques. Image registration according to the principles of the invention can produces high quality motion information at a reasonable cost.

The size of the spline patches and the order of spline interpolation can be easily be adjusted to provide solutions which vary smoothly in quality between the two prior art extremes. Moreover, the disclosed processes are substantially more efficient than correlation-based, or spatio-temporal filter-based techniques of comparable quality.

Compared with prior art global motion methods, the spline-based technique performs well. For planar flow, arbitrarily large motions and displacement are easily modeled, an uncalibrated camera can be used, and the internal camera parameters can vary over time.

Like known local methods, spline-based image registration produces local displacement estimates which perform well in the presence of independently moving objects and large depth variations.

However, unlike prior art local motion estimation, a local translation model in each correlation window is unnecessary. This is especially important for analyzing non-uniform optical flows which have substantial localized variations in flow.

Another significant advantage of the spline-based approach is that each pixel only contributes its error to the small number, typically four, of control vertices governing its displacement, thereby significantly reducing the processing time. In prior art solutions, the error contributes to the motion estimates of all windows which overlap that pixel.

Also, because the spline-based method has smoothness constraints built in, regularization procedures used in many prior art techniques, which may require many iterations to propagate local constraints, may not necessary.

The system and method of spline-based image registration as disclosed herein can be used for medical applications, multimedia, computer graphics, and architectural design. For example, a portable photo-scanner comprising a portable personal computer and a small video camera, and software designed according to the principles of the invention can be used to composite image pieces into a larger image. Other applications include the recovery of three-dimensional scene geometry, such as interior building architecture, and virtual reality environment construction.

It will be apparent to those skilled in the art that various modifications can be made to the spline-based image registration of the present invention without departing from the scope or spirit of the invention as set out in the appended claims.

We claim:

1. A method for extracting motion information from a sequence of images, comprising the steps of:

storing a first image in a memory as a first set of light intensity values;

storing a second image in said memory as a second set of light intensity values;

storing a spline control grid in said memory as a dam structure, said spline control grid having a plurality of control vertices at predetermined locations with respect to said second image;

transforming said second image to a derived image by a spline function in cooperation with the spline control grid, said spline control grid being a data structure stored said memory, the locations of said control vertices parametrizing said spline function;

comparing said first image to said derived image;

displacing, in response to there being a difference between said first image and said derived image, the locations of said control vertices to minimize the difference between said first and derived images; and repeating said transforming, comparing, and displacing steps until the difference between said first image and said second image is less than a desired amount, the locations of control vertices stored in said memory characterizing the motion information of said first image and said second image.

2. The method as in claim 1 further including adjusting said second set of light intensity values proportional to a distance between the locations of said control vertices and the locations of said light intensity values.

3. The method as in claim 1 wherein said transforming step uses a bi-linear spline function.

4. The method as in claim 1 wherein the locations of said control vertices are a regular sub-sampling of the locations of said second set of light intensity values.

5. The method as in claim 1 further including determining a light intensity gradient of said derived image at each location of said control vertices, and displacing the locations of said control vertices by and an amount proportional to a corresponding one of said light intensity gradients of each of said control vertices.

6. The method as in claim 1 wherein said second set of light intensity values are stored as a multi-level pixel pyramid having a plurality of image levels, said plurality of image levels arranged in a coarse-to-fine order.

7. The method as in claim 6 wherein said transforming, comparing, and displacing steps are first performed at a coarser image level of said multi-level pixel pyramid to extract coarse motion information, and where the coarse motion information is used to initiate said transforming, comparing, and displacing steps at a finer level of said multi-level pixel pyramid.

8. The method as in claim 1 wherein the motion of said first image relative to the motion of said second image is a planar optical flow, and wherein each control vertex is associated with a set of motion control parameters to specify the motion of said first image relative to the motion of said second image.

9. The method as in claim 1 wherein said transformation is a three-dimensional projective transformation to recover a depth estimate of the motion information, said depth estimate perpendicular to the plane of said first and second images.

10. The method as in claim 1 wherein the sequence of images are arranged in a temporal order, and further including determining a total differences between any two images of said sequence of images by summing the differences between intervening temporally adjacent pairs of images of said sequence of images.

11. In a computer system, a method for extracting motion information from a sequence of images, comprising:

storing a first set of light intensity values as a first image in a memory of the computer system;

storing a second set of light intensity values as a second image in the memory;

storing a plurality of control vertices in the memory as a data structure;

associating the plurality of control vertices with the second image, each control vertex having a predetermined location with respect to the second image;

adjusting the light intensity values of the second image to create a derived image, the adjusting being proportional to the distance between the control vertices and the light intensity values;

determining a difference in light intensity values between the first image and the derived image;

displacing each control vertex to a new predetermined location to minimize the difference between the first image and the derived image; and repeating the adjusting, determining, and displacing steps until the difference between the first image and the derived image is less than a predetermined amount, the locations of distorted control vertices stored in said memory characterizing the motion information of the first image and the second image.

12. The method as in claim 11 wherein the adjusting step uses a bi-linear spline function parametrized by the locations of the control vertices.

13. The method as in claim 11 wherein the location of said control vertices are a regular sub-sampling of the locations of the light intensity values of the second image.

14. The method as in claim 11 including determining an individual difference between each light intensity value of the first image and a corresponding light intensity value of the derived image;

combining the individual differences to determine the total difference between the first image and the derived image.

15. The method as in claim 11 including displacing the control vertices proportionally to the rate of change of the difference between said first and derived image while repeating the adjusting, determining, and displacing steps.

16. The method as in claim 11 wherein the first image and the second image are stored as multi-level pixel pyramid having a plurality of images levels, the plurality of image levels being arranged in a coarse-to-fine order.

17. The method as in claim 16 wherein the adjusting, determining, and displacing steps are first performed at a coarser level of the multi-level pixel grid to extract coarse motion information, and where the coarse motion information is used to initiate the adjusting, determining, and displacing steps at a finer level of the multi-level pixel pyramid.

18. The method as in claim 11 wherein the motion of said first image relative to said second image is planar optical flow, and assigning four control vertices to the second image.

19. The method as in claim 11 having a sequence of images arranged in a temporal order, and where a total differences of any two images of the sequence of images is determined by summing the differences between intervening temporally adjacent pairs of images of the sequence of images.

20. An apparatus for extracting motion information from a sequence of images, comprising:

a memory for storing a first image, a second image, and a plurality of control vertices associated with the second image, the first image, the second image, and the plurality of control vertices stored as data structures in the memory, the first and second images each expressed as a plurality of light intensity values, each light intensity value having a predetermined location, and the control vertices being expressed as coordinates relative to the locations of the light intensity values of the second image;

means for transforming the second image to a derived image by adjusting each light intensity value of the second image by an amount proportional to a distance between the location of a particular light intensity value and a location of a corresponding control vertex;

a comparator for determining a difference between the first image and the derived image; and means for adjusting the location of each of the plurality of control vertices to minimize the difference between the first image and the derived image, the adjusted locations of the control vertices parametrizing the motion information of the first image and the second image.

21. The apparatus of claim 20 wherein the proportional adjustment of the light intensity values of the second image are expressed by a spline-function parametrized by the coordinates of the control vertices.

22. The apparatus of claim 20 where the coordinates are a regular sub-sampling of the locations of the light intensity values.

23. The apparatus of claim 20 further including a spatial differentiator for determining a light intensity gradient at locations corresponding to the control vertices, and an error integrator for combining the light intensity gradients with the difference between the first image and the derived image to determine an amount for displacing each of the control vertices.

24. An apparatus for extracting motion information from a sequence of images, comprising:

a memory storing a first image, a second image, and a plurality of control vertices associated with the second image, the first image, the second image, and the plurality of control vertices stored as data structures in the memory, the first and second images each expressed as a plurality of light intensity values, each light intensity value having a predetermined location, and the control vertices being expressed as coordinates relative to the locations of the light intensity values of the second image;

means for transforming the second image to a derived image, the transformation adjusting each light intensity value of the second image by an amount proportional to a distance between the location of a particular light intensity value and a corresponding control vertex, the proportional amount expressed as a spline-function parametrized by the distance;

a comparator for determining a difference between the first image and the derived image; and means for adjusting the location of each of the plurality of control vertices to minimize the difference between the first image and the derived image, the adjusted locations of the control vertices stored in said memory parametrizing the motion information of the first image and the second image.

25. A computer implemented method for extracting motion information from a sequence of images, comprising the steps of:

storing a first physical image in a memory as a first set of light intensity values;

storing a second physical image in said memory as a second set of light intensity values;

defining, in said memory, a control grid for said first set of light intensity values, said control grid responsive to spline functions;

distorting said control grid into a distorted control grid;

interpreting the first set of light intensity values using said spline functions of said distorted control grid to generate a distorted set of light intensity values stored in said memory;

comparing said distorted set of light intensity values with said second set of light intensity values to determine a difference;

adjusting said distorted control grid to achieve a desired difference;

using a final distorted control grid stored in said memory after said desired difference is achieved to characterize motion of the light intensity values from said first physical image to said second physical image.

* * * * *